(12) United States Patent
Tanabe et al.

(10) Patent No.: US 7,249,106 B1
(45) Date of Patent: Jul. 24, 2007

(54) INFORMATION PROCESSING METHOD AND APPARATUS AND PROGRAM STORAGE MEDIUM FOR PROHIBITING DUPLICATION OF CONTENTS IN LARGE QUANTITIES

(75) Inventors: Mitsuru Tanabe, Kanagawa (JP); Itaru Kawakami, Kanagawa (JP); Ryuji Ishiguro, Tokyo (JP); Yuichi Ezura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/622,517

(22) PCT Filed: Dec. 24, 1999

(86) PCT No.: PCT/JP99/07302

§ 371 (c)(1),
(2), (4) Date: Sep. 28, 2000

(87) PCT Pub. No.: WO00/39800

PCT Pub. Date: Jul. 6, 2000

(30) Foreign Application Priority Data

Dec. 25, 1998 (JP) ............................ 10-369414
Feb. 17, 1999 (JP) ............................ 11-039222

(51) Int. Cl.
*G06Q 99/00* (2006.01)

(52) U.S. Cl. .................... 705/57; 705/51; 705/54; 705/58; 380/201; 380/202; 380/203; 380/204; 380/227; 380/228; 380/229; 380/230; 726/31; 726/32; 726/33

(58) Field of Classification Search ............. 705/51, 705/57–8, 59, 54; 380/201–204, 227–230; 713/130, 170; 726/31–33
See application file for complete search history.

(56) References Cited

U.S. PATENT DOCUMENTS

| | | | | | |
|---|---|---|---|---|---|
| 4,965,680 | A | * | 10/1990 | Endoh | 360/60 |
| 5,014,234 | A | * | 5/1991 | Edwards, Jr. | 713/200 |
| 5,584,023 | A | * | 12/1996 | Hsu | 707/204 |
| 5,621,810 | A | * | 4/1997 | Suzuki et al. | 382/135 |
| 5,627,655 | A | * | 5/1997 | Okamoto et al. | 386/94 |
| 5,696,989 | A | * | 12/1997 | Miura et al. | 710/24 |
| 5,699,370 | A | * | 12/1997 | Kaniwa et al. | 714/811 |
| 5,805,551 | A | * | 9/1998 | Oshima et al. | 705/57 |
| 5,832,083 | A | * | 11/1998 | Iwayama et al. | 705/51 |
| 5,884,072 | A | * | 3/1999 | Rasmussen | 709/223 |
| 5,889,868 | A | * | 3/1999 | Moskowitz et al. | 713/176 |

(Continued)

FOREIGN PATENT DOCUMENTS

EP 0 813 194 12/1997

*Primary Examiner*—Bradley B. Bayat
(74) *Attorney, Agent, or Firm*—Oblon, Spivak, McClelland, Maier & Neustadt, P.C.

(57) ABSTRACT

A contents database 114 memorizes the discriminating information for discriminating contents and the temporal information as to the time of content duplication associated with the discriminating information. A recording program 113 acquires the discriminating information of contents to be duplicated and duplicates the contents in association with the acquired discriminating information and with the temporal information memorized in the contents database 114. This substantially prohibits duplication in large quantities without significantly impairing the interests of a user.

13 Claims, 36 Drawing Sheets

U.S. PATENT DOCUMENTS

| | | | |
|---|---|---|---|
| 5,907,443 A * | 5/1999 | Hirata | 360/60 |
| 5,912,969 A * | 6/1999 | Sasamoto et al. | 705/57 |
| 5,923,485 A * | 7/1999 | Ito | 360/31 |
| 5,923,486 A * | 7/1999 | Sugiyama et al. | 360/60 |
| 5,933,625 A * | 8/1999 | Sugiyama | 713/503 |
| 5,963,382 A * | 10/1999 | Abe | 360/5 |
| 6,034,832 A * | 3/2000 | Ichimura et al. | 360/60 |
| 6,044,197 A * | 3/2000 | Smith et al. | 386/55 |
| 6,298,022 B1 * | 10/2001 | Aramaki et al. | 369/47.11 |
| 6,389,403 B1 * | 5/2002 | Dorak, Jr. | 705/52 |
| 6,389,538 B1 * | 5/2002 | Gruse et al. | 713/194 |

* cited by examiner

TERMINAL DATABASE

|  | ITEM 1 | ITEM 2 | ITEM 3 |  |
|---|---|---|---|---|
| ISRC | JP-Z90-98-12345 | US-Z90-99-12346 | JP-Z90-98-12347 |  |
| DATE AND TIME OF COPYING | 1998.11.23.08:04 | 2004.03.06.16:09 | 2004.03.06.16:15 |  |

| HASH VALUE | 0xf3352e125934 |
|---|---|

NUMBER DATABASE

| | ITEM 1 | ITEM 2 | ITEM 3 |
|---|---|---|---|
| FILE NAME | Xd000110. st2 | px92341234. at2 | aa0234287034. at2 |
| ENCRYPTED KEY | 0xabababababab | 0x989898989898989 | 0x123456789012 |
| NAME OF NUMBER | BROOK IN SPRING | SCHICKSAL | MOON IN FORLORN CASTLE |
| DURATION | 180 | 190 | 200 |
| PLAY CONDITION : DATE AND TIME OF START | - | - | - |
| PLAY CONDITION : DATE AND TIME OF END | 1999.07.31.23:59 | 2001.01.01.00:00 | - |
| PLAY CONDITION : LIMIT ON NUMBER OF TIMES | - | 20 | - |
| NUMBER OF TIMES OF PLAY COUNTER | - | 12 | - |
| BILLING CONDITION ON PLAYING | - | - | ¥5 |
| COPYING CONDITION : NUMBER OF TIMES | 2 | 0 | 0 |
| NUMBER OF TIMES OF COPYING COUNTER | 1 | 0 | 0 |
| COPYING CONDITION : SCMS | 0b01 | 0b10 | 0b00 |

| HASH VALUE | 0xf9951e566321 |
|---|---|

FIG.11

PLAY CONDITION MANAGED BY PORTABLE DEVICE

|  | ITEM 1 | ITEM 2 | ITEM 3 |
|---|---|---|---|
| NUMBER ID | 00001 | 00002 | 00003 |
| DATE AND TIME OF REPLAY START | 1999.07.31.23:59 | 1999.07.31.23:59 | 1999.07.31.23:59 |
| DATE AND TIME OF REPLAY END | 2001.01.01.00:00 | 2001.01.01.00:00 | 2001.01.01.00:00 |
| NUMBER OF TIMES OF REPLAY | - | 15 | - |

FIG.14

CHARGING LOG

|  | ITEM 1 | ITEM 2 | ITEM 3 |  |
|---|---|---|---|---|
| FEE | 50 | 50 | 50 |  |

| HASH VALUE | 0xf8783e263517 |
|---|---|

FIG.21

INFORMATION PROCESSING METHOD AND APPARATUS AND PROGRAM STORAGE MEDIUM FOR PROHIBITING DUPLICATION OF CONTENTS IN LARGE QUANTITIES

TECHNICAL FIELD

This invention relates to an information processing method and apparatus and a program storage medium. More particularly, it relates to an information processing method and apparatus and a program storage medium in which duplication of contents can be limited appropriately.

BACKGROUND ART

There have so far been presented SCMS (Serial Copy Management System) and CGMS (Copy Generation Management System) as methods for limiting duplication of AV contents for which the copyright has been set, such as music or pictures.

In these systems, it is possible to duplicate contents A1 (first generation), for which the copyright has been set, to acquire (or record) contents A2 (second generation), however, it is not possible to duplicate the contents A2 (second generation) further to acquire contents A3 (third generation), as shown in FIG. 1.

DISCLOSURE OF THE INVENTION

However, in such case, the contents A1 can be repeatedly duplicated to acquire plural contents A2 of the second generation, such that the copyright of the contents A1 is not protected sufficiently.

So, as a method for enabling the contents A1 to be duplicated only once, the UCS (Unit Copy System) has been proposed. However, in such case, the user is allowed to duplicate the contents only once even though the duplication is used for his or her private use, with the result that the method impairs the interests of the user.

In view of the present status of the art, as described above, it is an object of the present invention to render it possible to substantially prohibit duplication in large quantities without impairing the interests of the user.

In one aspect, the present invention provides an information processing apparatus including storage means for storing the information for discriminating contents and the time information for the time the contents have been duplicated, acquisition means for acquiring the information for discriminating contents to be duplicated, and duplication means for duplicating the contents in association with the discrimination information acquired by including acquisition means and the time information held in including storage means.

In another aspect, the present invention provides an information processing method including a storage step for storing the information for discriminating contents and the time information for the time the contents have been duplicated, an acquisition step for acquiring the information for discriminating contents to be duplicated, and a duplication step for duplicating the contents in association with the discrimination information acquired by including acquisition step and the time information held in including storage step.

In yet another aspect, the present invention provides a program storage medium having stored therein a computer-readable program, which program includes a storage step for storing the information for discriminating contents and the time information for the time the contents have been duplicated, an acquisition step for acquiring the information for discriminating contents to be duplicated and a duplication step for duplicating the contents in association with the discrimination information acquired by including acquisition step and the time information held in including storage step.

BRIEF DESCRIPTION OF THE DRAWINGS

FIG. 11 illustrates an example of a terminal database.

FIG. 14 illustrates the reproduction condition managed by the portable device 6.

FIG. 21 illustrates a billing log.

BEST MODE FOR CARRYING OUT THE INVENTION

Figure 1:
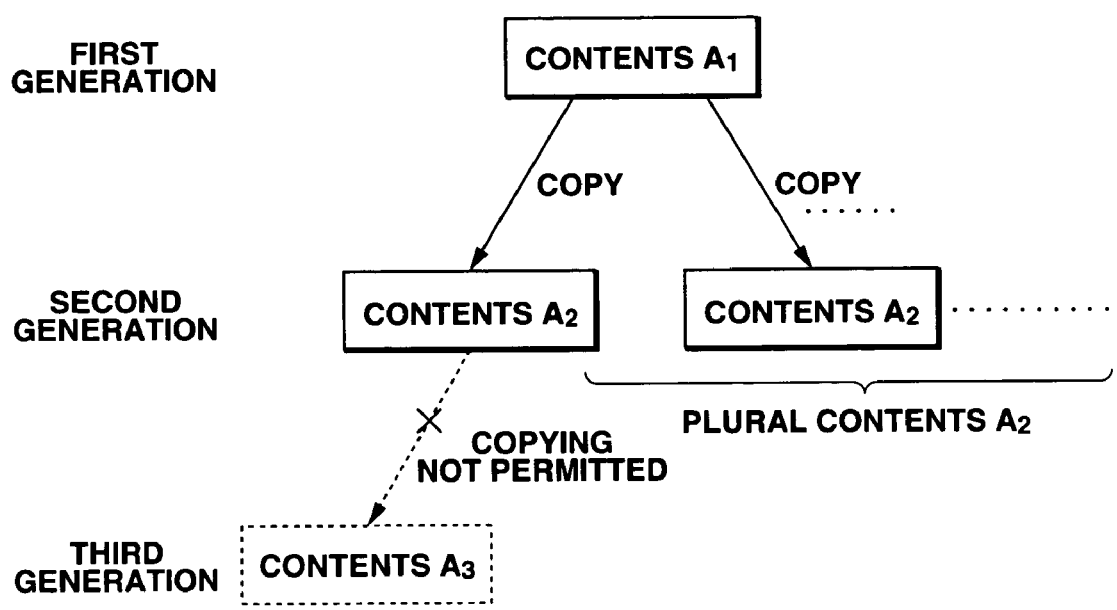
FIG. 1 illustrates the SCMS and CGMS.

Referring to the drawings, preferred embodiments of the present invention will be explained in detail.

Figure 2:
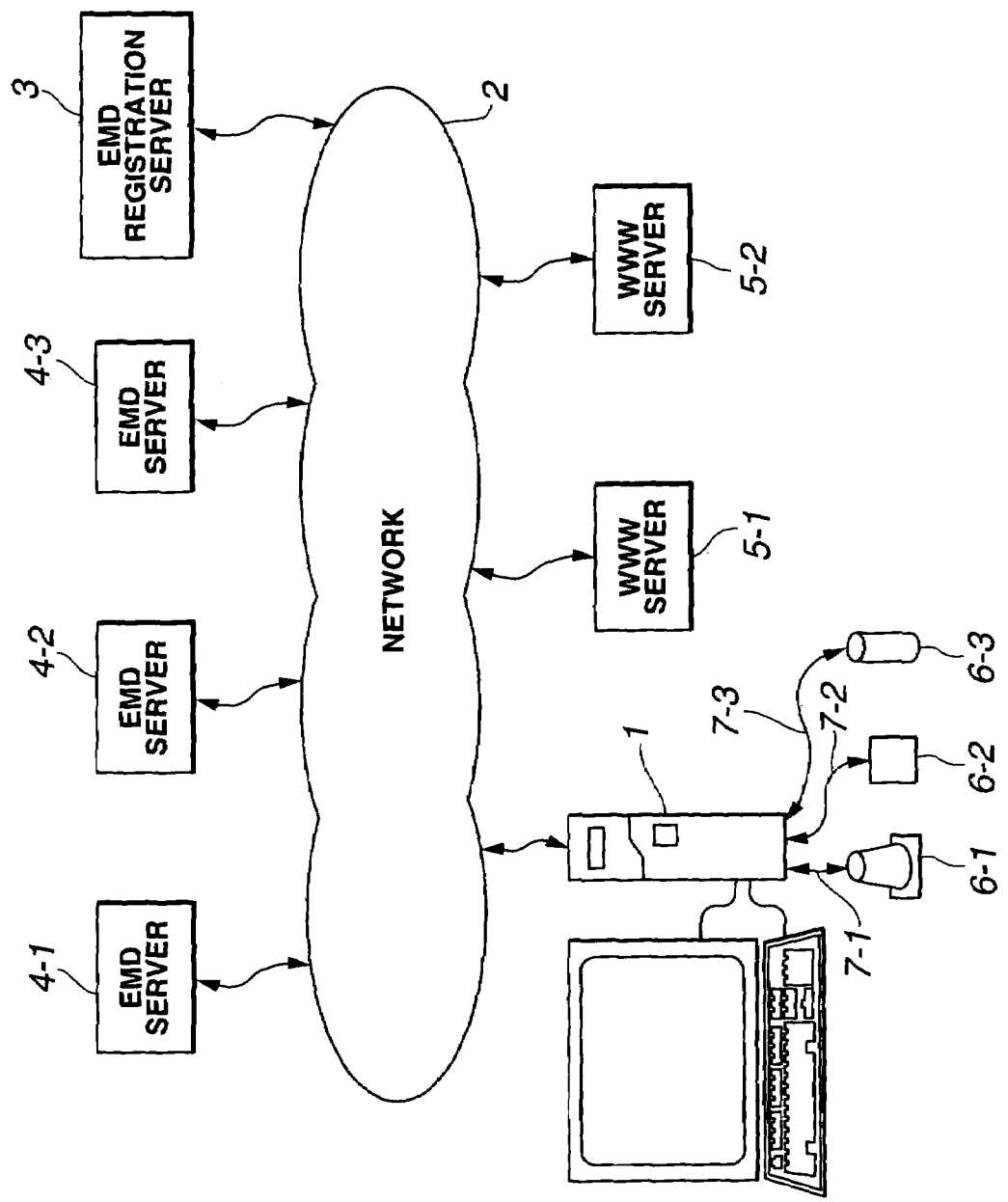
FIG. 2 shows an embodiment of a speech data management system according to the present invention.

FIG. 2 shows an embodiment of a speech data management system according to the present invention. A personal computer 1 is connected to a network 2 constituted by, for example, Local Area Network of Internet. The personal computer 1 transforms music data received from EMD (Electrical Music Distribution) servers 4-1 to 4-3 or read from a CD (Compact Disc), as later explained, referred to below as contents, in accordance with a pre-set compression system, such as ATRAC3 (trade mark), and encrypts the transformed music data in accordance with an encryption system such as DES (Data Encryption Standard) to record the encrypted music data.

The personal computer 1 records data of usage rules, representing the usage rules of contents, in association with the contents recorded in the encrypted form. For example, the data of the usage rules indicate that the contents corresponding to the data of the usage rules can be used simultaneously on three portable devices, also termed PDs, 6-1 to 6-3, copied or moved to another personal computer. It is noted that, if the contents are stored in the portable devices 6-1 to 6-3 by copying, the contents recorded on the personal computer 1 can be used. There are occasions wherein limitations are imposed on the number of times the contents can be stored in the portable devices 6-1 to 6-3. In this case, the number of times cannot be increased. It is also noted that, if the contents have been stored by moving in the portable devices 6-1 to 6-3, the contents stored in the personal computer 1 cease to be usable. The data of the usage rules will be discussed subsequently in detail.

The personal computer 1 stores the contents, recorded in the encrypted form, in the portable device 6-1, connected thereto, over a USB (Universal Serial Bus) cable 7-1, along with data pertinent to the contents, such as name of music number or playback conditions), while updating the data of the usage rules, associated with the stored contents, in connection with the storage in the portable device 6-1. This processing is referred to below as checkout. In more detail, on doing such check-out, the number of times of possible checkout of the data of the usage rules, associated with the contents, as recorded by the personal computer 1, is decremented by one. If the number of times of possible checkout is 0, the corresponding contents cannot be checked out.

The personal computer 1 stores the contents, recorded in the encrypted form, in the portable device 6-2, connected thereto, over a USB cable 7-2, along with data pertinent to the contents, while updating the data of the usage rules, associated with the stored contents, in connection with the storage in the portable device 6-2. The personal computer 1 stores the contents, recorded in the encrypted form, in the portable device 6-3, connected thereto, over a USB cable 7-3, along with data pertinent to the contents, while updating the data of the usage rules, associated with the stored contents, in connection with the storage in the portable device 6-3.

The personal computer 1 also causes the portable device 6-1 connected thereto to erase or make unusable the contents checked out by the personal computer 1 to the portable device 6-1, through a USB cable 7-1 to update data of the usage rules corresponding to the erased contents. This operation referred to below as check-in. More specifically, on check-in, the number of times of possible checkout of the data of usage rules of corresponding contents recorded by the personal computer 1 is incremented by one.

The personal computer 1 also causes the portable device 6-2 connected thereto to erase or make unusable the contents checked out by the personal computer 1 to the portable device 6-2, through a USB cable 7-2, to update data of the usage rules corresponding to the erased contents. The personal computer 1 also causes the portable device 6-3 connected thereto to erase or make unusable the contents checked out by the personal computer 1 to the portable device 6-3, through a USB cable 7-3, to update data of the usage rules corresponding to the erased contents.

The personal computer 1 is unable to check-in the contents checked out by another personal computer, not shown, to the portable device 6-1. The personal computer 1 is unable to check-in the contents checked out by the other personal computer, not shown, to the portable device 6-2. Similarly, the personal computer 1 is unable to check-in the contents checked out by the other personal computer, not shown, to the portable device 6-3.

When the personal computer 1 starts to acquire the contents from EMD servers 4-1 to 4-3, an EMD registration server 3 is responsive to a request from the personal computer 1 to transmit an authentication key necessary for reciprocal authentication between the personal computer 1 and the EMD servers 4-1 to 4-3, through the network 2, as well as to transmit a program for connection to the EMD servers 4-1 to 4-3 to the personal computer 1.

The EMD server 4-1 is responsive to a request by the personal computer 1 to send contents to the personal computer 1 over the network 2 along with data pertinent to the contents, such as name of the musical number or limitation on reproduction. The EMD server 4-2 is responsive to a request by the personal computer 1 to send contents to the personal computer 1 over the network 2 along with data pertinent to the contents. The EMD server 4-3 also is responsive to a request by the personal computer 1 to send contents to the personal computer 1 over the network 2 along with data pertinent to the contents.

The contents supplied by each of the EMD servers 4-1 to 4-3 are compressed in accordance with the same or different compression systems. The contents supplied by each of the EMD servers 4-1 to 4-3 are also compressed in accordance with the same of different encryption systems.

A WWW (World Wide Web) server 5-1 is responsive to the request by the personal computer 1 to send data pertinent to a CD the contents of which have been read out, such as album name or a manufacturing firm of the CD, and data corresponding to the contents read out from the CD, such as name of the musical number or that of a composer, to the personal computer 1 over the network 2. The WWW server 5-2 is responsive to the request by the personal computer 1 to send data pertinent to a CD, the contents of which have been read out, and data corresponding to the contents read out from the CD, to the personal computer 1 over the network 2.

The portable device 6-1 stores the contents sent from the personal computer 1, that is the checked-out contents, along with the data pertinent to the contents, such as name of the musical number or limitation on reproduction. The portable device 6-1 reproduces the stored contents, based on the data pertinent to the contents-related data, to output the reproduced contents to a headphone, not shown.

For example, when contents are about to be reproduced a number of times exceeding the number of times of reproduction as limitations on the reproduction, stored as the contents-related data, the portable device 6-1 halts the reproduction of the relevant contents. When contents are about to be reproduced after a number of times exceeding the number of times of reproduction as limitations on the reproduction, stored as the contents-related data, the portable device 6-1 halts the reproduction of the relevant contents.

The user dismounts the portable device 6-1, which has stored the contents, from the personal computer 1, carries it about and reproduces the stored contents to listen to the music corresponding to the contents by e.g., a headphone.

The portable device 6-2 stores the contents supplied from the personal computer 1 along with data pertinent to the contents. The portable device 6-2 reproduces the stored contents, based on the contents-related data, to output the reproduced data to e.g., a headphone, not shown. The user dismounts the portable device 6-2, which has stored the contents, from the personal computer 1, carries it about and reproduces the stored contents to listen to the music corresponding to the contents by e.g., a headphone.

The portable device 6-3 stores the contents supplied from the personal computer 1 along with data pertinent to the contents. The portable device 6-3 reproduces the stored contents, based on the contents-related data, to output the reproduced data to e.g., a headphone, not shown. The user dismounts the portable device 6-3, which has stored the contents, from the personal computer 1, carries it about and reproduces the stored contents to listen to the music corresponding to the contents by e.g., a headphone.

In the following, if it is unnecessary to distinguish the portable devices 6-1 to portable device 6-3, it is simply referred to as a portable device 6.

Figure 3:
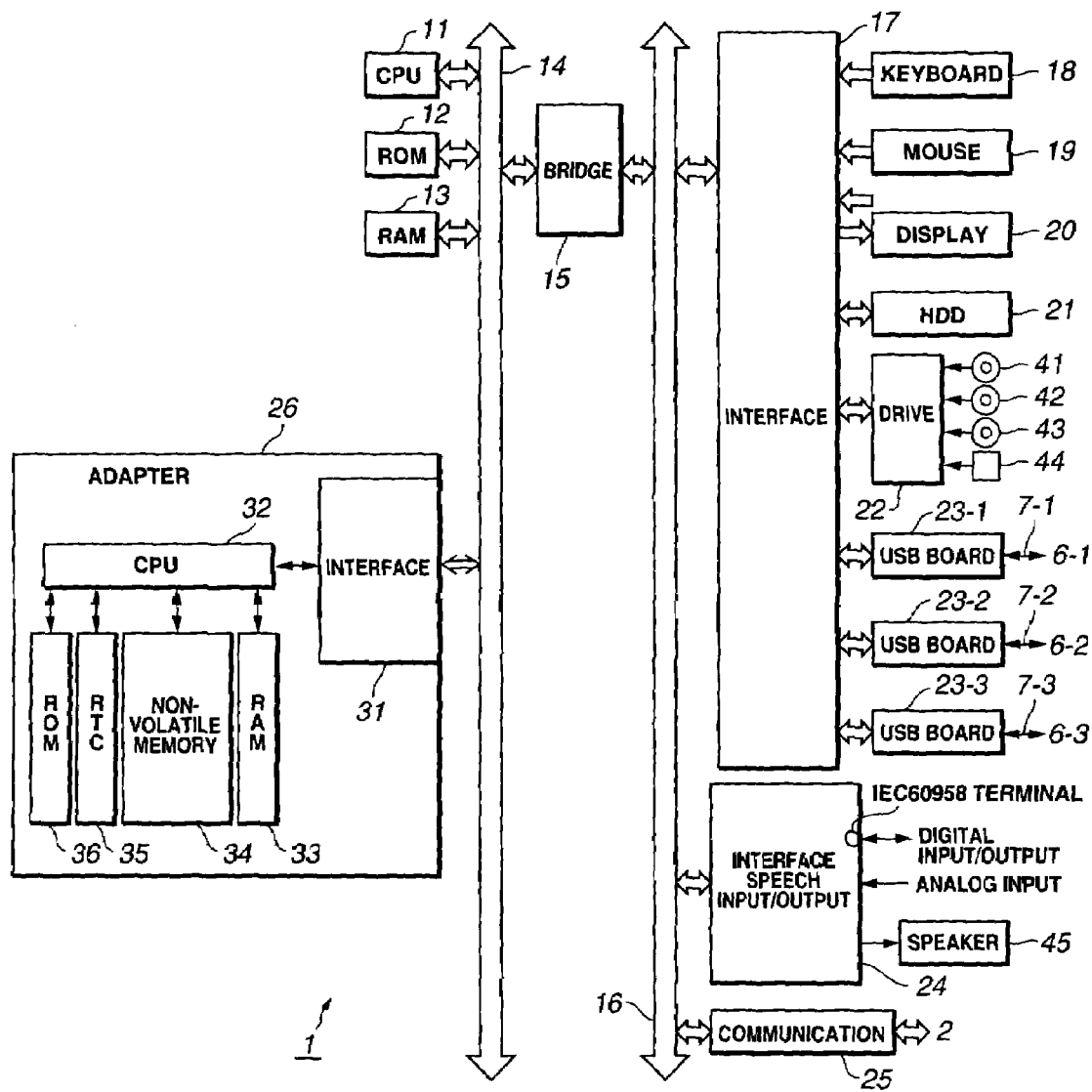
FIG. 3 illustrates the structure of a personal computer in the speech data management system.

FIG. 3 illustrates the structure of the personal computer 1. A CPU (Central Processing Unit) 11 actually executes a variety of application programs, details of which will be explained later on, and an OS (Operating System). A ROM (Read-only Memory) 12 in general stores basically fixed data, among the programs used by the CPU 11 or parameters used for calculations. A RAM (Random-Access Memory) 13 stores the programs used by the CPU in the processing by the CPU 11 and parameters incidentally changed in execution of the programs. These components are interconnected by a host bus 14 constituted e.g., by a CPU bus.

The host bus 14 is connected over a bridge 15 to an external bus 16, such as a PCI (Peripheral Component Interconnect/Interface) bus.

A keyboard 18 is acted on by the user when a variety of commands are inputted to the CPU 11. A mouse 19 is acted on by the user when commanding or selecting a point on a screen of a display 20. The display 20 is made up e.g., of a liquid crystal device or a CRT (Cathode Ray Tube) and demonstrates a variety of the information by texts or images. A HDD (Hard Disc Device) 21 drives a hard disc to cause it to record and/or reproduce the program executed by the CPU 11 or the information.

A drive 22 reads out data or programs recorded on a magnetic disc 41, an optical disc 42 (inclusive of a CD), a magneto-optical disc 43 or a semiconductor memory 44, loaded thereon, to route the data or the program to the RAM 13 connected to the drive 22 through an interface 17, an external bus 16, a bridge 15 and a host bus 14.

To a USB port 23-1 is connected the portable device 6-1 over a USB cable 7-1. The USB port 23-1 outputs data supplied from the HDD 21, CPU 11 or the RAM 13 over the interface 17, external bus 16, bridge 15 or the host bus 14, such as contents or commands for the portable device 6-1, to the portable device 6-1.

To a USB port 23-2 is connected the portable device 6-2 over a USB cable 7-2. The USB port 23-2 outputs data supplied from the HDD 21, CPU 11 or the RAM 13 over the interface 17, external bus 16, bridge 15 or the host bus 14, such as contents or commands for the portable device 6-2, to the portable device 6-2.

To a USB port 23-3 is connected the portable device 6-3 over a USB cable 7-3. The USB port 23-3 outputs data supplied from the HDD 21, CPU 11 or the RAM 13 over the interface 17, external bus 16, bridge 15 or the host bus 14, such as contents or commands for the portable device 6-3, to the portable device 6-3.

A speech input/output interface 24, having an IEC (International Electrotechnical Commission) 60958 terminal, executes interfacing processing of the digital speech input/output or the analog speech input/output. A speaker 45 outputs a pre-set speech corresponding to the contents based on the speech signal supplied from the speech input/output interface 24.

The components from the keyboard 18 to the speech input/output interface 24 are connected to the interface 17 which in turn is connected to the CPU 11 over the external bus 16, bridge 15 and the host bus 14.

A communication unit 25, to which is connected the network 2, transmits data supplied from the CPU 11 or the HDD 21, such as requests for registration or requests for transmission of contents, in a packet of a pre-set form, and transmits the resulting data over the network 2, while outputting the data stored in the received packet, such as authentication key or contents, to the CPU 11, RAM 13 or to the HDD 21.

A CPU 32 of an adapter 26, constructed monolithically as a semiconductor IC and loaded on the personal computer 1, cooperates with the CPU 11 of the personal computer 1 over the external bus 16, bridge 15 and the host bus 14, to execute a variety of processing operations. A RAM 33 stores data or programs necessary for the CPU 11 to execute the variable processing operations. A non-volatile memory 34 stores data that needs to be held even after the power source of the personal computer 1 is turned off. In a ROM 36 is stored a program for decoding an encrypted program transmitted from the personal computer 1. A RTC (Real Time Clock) 35 executes time measurement operation to provide the time information.

The communication unit 25 and the adapter 26 are connected over the external bus 16, bridge 15 and the host bus 14 to the CPU 11.

In the following, if there is no necessity for distinguishing the USB ports 23-1 to 23-3 from one another, these are simply referred to as USB ports 23. Similarly, if there is no necessity for distinguishing the USB cables 7-1 to 7-3 from one another, these are simply referred to as USB cables 7.

The structure of the portable device 6 is hereinafter explained with reference to FIG. 4. A power source circuit 52 converts the source voltage supplied from a dry cell 51 to an internal power of a pre-set voltage which is supplied to components from the CPU 53 to a display unit 67 to drive the portable device 6 in its entirety.

If a USB controller 57 is connected over a USB connector 56 and the USB cable 7 to the personal computer 1, the USB controller 57 routes the contents transmitted from the personal computer 1 over an internal bus 58 to the CPU 53.

The contents are made up of 64-byte-per-packet data and are transmitted from the personal computer 1 at a transfer rate of 12 Mbits/sec.

The contents transmitted to the portable device 6 are made up of a header and speech data (data corresponding to speech data as the subject of the contents). In the header are stored, in addition to a filename, a header size, contents keys, file size, codec ID and the file information, data on reproduction limitation necessary in reproduction limiting processing, start date and time, end date and time, limitation on the number of times, and a number of times of reproduction count. The speech data is data corresponding to the speech signals of a pre-set musical number. This data is data encoded in accordance with an encoding system, such as ATRAC 3, and which is encrypted subsequently.

The header size represents the data length of a header, such as 33 bytes, whilst the file size represents the data length of speech data, such as 33,636,138 bytes.

A content key is a key used for decoding encrypted speech data and is transmitted from the personal computer 1 to the portable device 6 in a state in which it is encrypted based on a session key (transient key) generated by processing of reciprocal authentication between the personal computer 1 and the portable device 6.

When the portable device 6 is connected over the USB cable 7 to the USB port 23 of the personal computer 1, the portable device 6 and the personal computer 1 execute the processing of reciprocal authentication. This processing of reciprocal authentication may, for example, be a reciprocal authentication processing of the challenge-response system. Meanwhile, a DSP 59 of the portable device 6, executing the authentication processing of the challenge-response system, executes the processing of decrypting (decoding) processing.

The challenge-response system is such a system in which the portable device 6 responds to a value generated by the personal computer 1 (challenge) with a value generated using a confidential key which the portable device 6 co-owns with the personal computer 1 (response). In the reciprocal authentication processing of the challenge-response system, the value generated by the personal computer 1 is changed every authentication processing, so that, if the value generated using the confidential key and outputted by the portable device 6 is read out and used in a so-called disguised attack, the value used in the reciprocal authentication differs in the next reciprocal authentication, and hence the personal computer 1 is able to detect the illicitness.

The codec ID is an ID corresponding to the speech data encoding system. Specifically, a codec ID "1" corresponds to ATRAC 3, whilst a codec ID "0" corresponds to MP3 (MPEG (Moving Picture Experts Group) Audio Layer-3).

The filename is data obtained on converting a content file corresponding to contents, recorded by the personal computer 1, as later explained, into ASCII ((American National Standard Code for Information Interchange) code, whilst the file information is data obtained on converting the name of a music number, name of an artist, name of a lyric writer or the name of a composer into the ASCII code.

The reproduction limitation data is data specifying whether or not the period during which reproduction of contents is possible, that is start date and time or end date and time, or number of times limitation, that is limitation on the number of times of reproduction, is set. If the number of times of limitation has been set, or if the period during which reproduction is possible is set, "1" or "2" is set for the reproduction limitation data, respectively. If neither the number of times limitation nor the period during which reproduction is possible is set, that is if the apparatus is purchased on spot, "0" is allocated for the reproduction limitation data.

If the reproduction limitation data is "2", the start date and time and end date and time are data indicating the period during which reproduction is possible. For example, if the start date and time is "00040F" and end date and time is "00070F", the corresponding contents can be reproduced as from Apr. 15, 2000 until Jul. 15, 2000.

Similarly, as for the number of times limitation and the number of times of reproduction counter, if the reproduction limitation data is "1" or "2", the number of times of limitation is the number of times of possible reproduction, as previously set in association with the contents, whilst the number of times of reproduction counter indicates the number of time the contents have been reproduced. The number of times of reproduction is innovated by the CPU53 when the processing for reproducing the contents has been carried out. For example, if the number of times limitation is "02", the number of times of possible reproduction of the contents is 2, whereas, if the number of times limitation is "01", the number of times the contents have been reproduced is 1.

For example, if the reproduction limitation data is "2", the start date and time is "00040F" and the end date and time is "00070F", with the reproduction limitation data being "2", the portable device 6 is able to reproduce the corresponding contents repeatedly twice a day during the period as from Apr. 15, 2000 until Jul. 15, 2000.

For example, if the reproduction limitation data is "1", the start date and time is "000000" and the end date and time is "000000", with the reproduction limitation data being "0a" and the number of times of reproduction counter being "05", there is no limitation on the corresponding contents as for the period during which reproduction is possible, with the number of times of possible reproduction being 10 and with the number of times of reproduction performed being 5.

If the portable device 6 has received a content write command, along with the contents, from the personal computer 1, the CPU 53, adapted for executing the main program read out from the ROM 55 to the RAM 54, receives a write command and controls a flash memory controller 60 to cause the contents received from the personal computer 1 to be written in a flash memory 61.

The flash memory 61 has a recording capacity of approximately 64 MBytes and stores the contents (speech data). There is also stored in the flash memory 61 a reproduction code for expanding the speech data compressed in accordance with a pre-set compression system.

Meanwhile, the flash memory 61 can be mounted on or dismounted from the portable device 6.

If a playback command by the user, corresponding to the pushing of a play/stop button, not shown, is sent through an operation key controller 62 to the CPU 53, the latter causes a flash memory controller 60 to read out the playback code and the speech data from the flash memory 61 to transfer the read-out data to a DSP 59.

Figure 4:
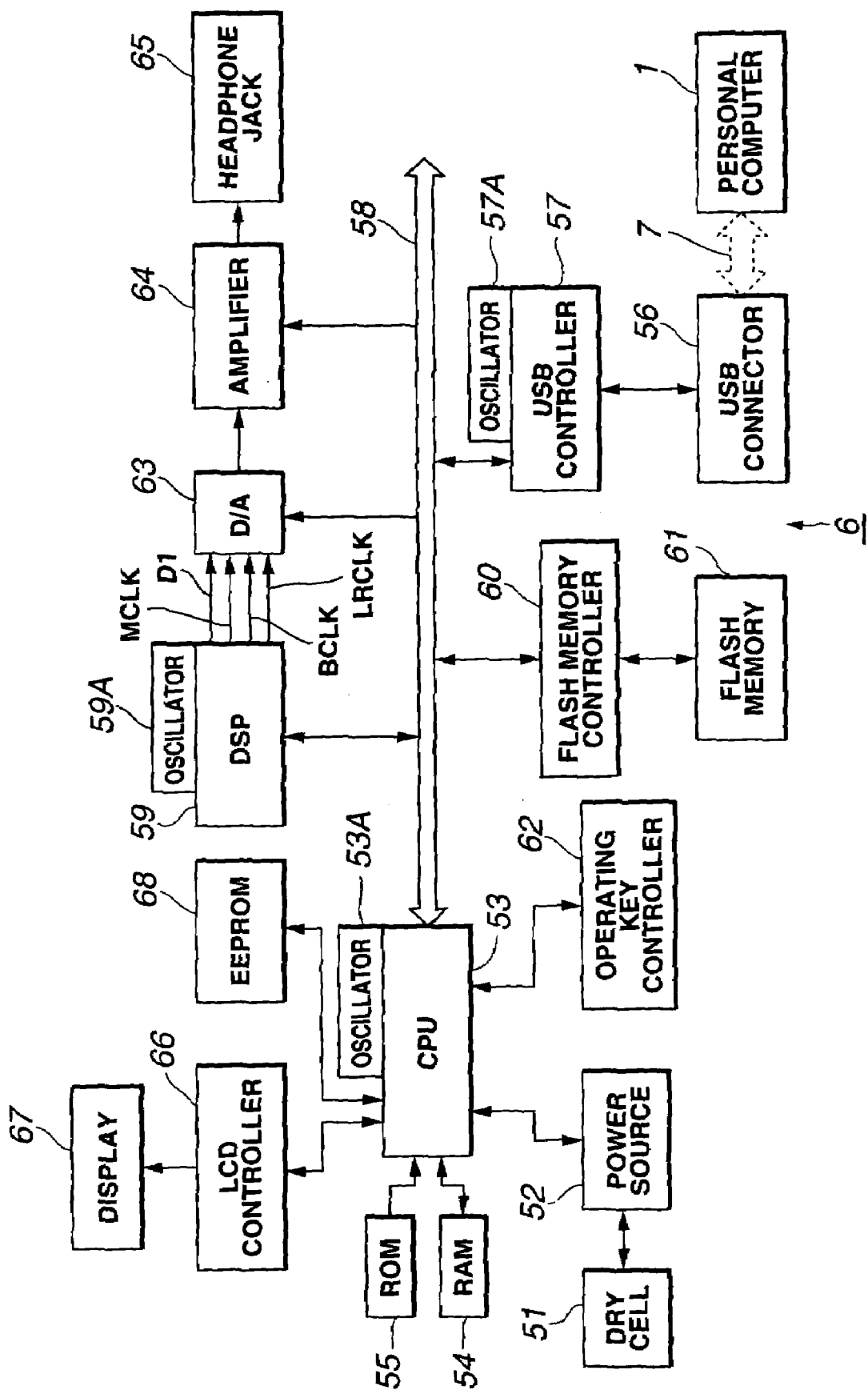
FIG. 4 shows the structure of a portable device in the speech data management system.

The DSP 59 corrects the speech data for errors in accordance with the CRC (Cyclic Redundancy Check) system, based on the playback code transferred from the flash memory 61, reproduces the data and sends the reproduced data, indicated D1 in FIG. 4, to a digital/analog conversion circuit 63.

The DSP 59 is constructed monolithically with a transmission circuit, not shown, and reproduces the speech data based on master clocks MCLK from an externally mounted quartz oscillator 59A, while sending the master clocks MCLK, operating clocks LRCLK, made up of bit clocks BCLK of a pre-set frequency, generated by an internal oscillation circuit based on the master clocks MCLK, and frame-based L-channel and R-channel clocks, to a digital/analog conversion circuit 63.

When reproducing speech data, the DSP 59 sends the aforementioned operating clocks to the digital/analog conversion circuit 63 in accordance with the reproduction code. When not reproducing speech data, the DSP 59 halts supply o the operating clocks, in accordance with the reproduction code, to halt the digital/analog conversion circuit 63 to decrease the power consumption of the entire portable device 6.

Similarly, quartz oscillators 53A, 57A of the CPU 53 and the USB controller 57 are externally mounted, so that the CPU 53 and the USB controller 57 execute pre-set processing based on the master clocks MCLK supplied from the oscillators 53A, 57A.

By the above-described structure of the portable device 6, clock generating modules for supplying clocks to respective circuit blocks, such as CPU 53, DSP 59 or the USB controller 57, are unnecessary, thereby simplifying and reducing the size of the circuitry.

The digital/analog conversion circuit 63 converts reproduced speech data into analog speech signals which are sent to an amplifier circuit 64. This amplifier circuit 64 then amplifies the speech signals to send the amplified speech signals to a headphone, not shown, via a headphone jack 65.

Thus, when a play/halt button, not shown, is acted on, the portable device 6 reproduces speech data stored in the flash memory 61, under control by the CPU 53. If the play/stop button is pushed during reproduction, the portable device 6 halts the reproduction of the speech data.

If the play/stop button is again pushed after halting, the portable device 6 re-initiates reproduction of the speech data from the previous stop position, under control by the CPU 53. If a few seconds have elapsed with the play/stop button remaining unactuated after halting of the reproduction by previous actuation of the play/stop button, the portable device 6 automatically interrupts the power source to save the power consumption.

Meanwhile, if the play/stop button is thrust after turning off of the power source, the portable device 6 reproduces speech data as from the first musical number, without reproducing the speech data as from the previous stop position.

On the other hand, the CPU 53 of the portable device 6 controls an LCD controller 68 to demonstrate on the display unit 67 such information as the state of the playback mode, e.g., repetitive reproduction or intro-reproduction, equalizer adjustment, that is gain adjustment corresponding to the frequency range of the speech signals, number of a musical number, play time, states of play, stop, fast feed or fast rewind, speech sound level, residual capacity of the dry cell 51, etc.

Moreover, the portable device 6 stores the so-called FAT (File AllocationTtable), such as the number of contents written in a flash memory 80, block positions of the flash memory 61 in which respective contents are written, and a variety of other memory storage information, in the EEPROM 68.

In the present embodiment, speech data are handled with 64 KBytes as one block, and a block position corresponding to the contents of a music number is stored in the FAT.

If, in storing the FAT in the flash memory 61, the contents of the first music number, for example, are written in the flash memory 61 under control by the CPU 53, the block position corresponding to the contents of the first musical number is written as the FAT in the flash memory 61. If then the contents of the second musical number are written in the flash memory 61, the block position corresponding to the contents of the second music number is written as FAT in the flash memory 61, specifically, in the same area as that for the first music number.

In this manner, the FAT is rewritten each time the contents are written in the flash memory 61. In addition, for data protection, the same data is written as reserve data in duplex.

If FAT is written in the flash memory 61, the same area in the flash memory 61 is rewritten twice, for writing of sole contents, so that the number of times of rewriting prescribed for the flash memory 61 is reached with a smaller number of times of contents writing to render the rewriting of the flash memory 61 impossible.

So, the portable device 6 causes the FAT to be stored in the EEPROM 68 to decrease the frequency of rewriting of the flash memory 61 corresponding to the writing of sole contents.

By storing the FAT having a larger number of times of rewriting in the EEPROM 68, it is possible with the portable device 6 to increase the number of times of possible writing of contents to a factor of not less than a few tens as compared to the case of storing the FAT in the flash memory 61. Moreover, since the CPU 53 causes the FAT to be written in an overwriting fashion in the EEPROM 68, the frequency of rewriting of the same area in the EEPROM 68 can be diminished to prevent the EEPROM 68 from becoming unable to be rewritten in a shorter time.

When connected to the personal computer 1 over the USB cable 7, the portable device 6 recognizes this connection, based on an interrupt signal supplied from the USB controller 57 to the CPU 53. This connection is referred to below as USB connection When the portable device 6 has recognized that fact that it has been USB connected, it is supplied with an external power of a pre-set current value from the personal computer 1, over the USB cable 7. On the other hand, the portable device 6 controls a power source circuit 52 to halt the power supply from the dry cell 51.

When USB connected, the CPU 53 halts the processing of reproducing speech data by the DSP 59. So, the CPU 53 performs control such that the external power supplied from the personal computer 1 is prevented from exceeding a predetermined current value so that the external power of a predetermined current value will be supplied at all times.

Thus, on USB connection, the CPU 53 switches from the power supplied from the dry cell 51 to that supplied from the personal computer 1, so that the external power from the personal computer with low unit power cost is used to reduce the power consumption of the dry cell 51 with high unit power price thus elongating the durability of the dry cell 51.

When fed with the external power over the USB cable 7 from the personal computer 1, the CPU 53 halts the reproducing processing of the DSP 59 to reduce the radiation from the DSP 59 thereby further reducing the radiation of the entire system inclusive of the personal computer 1.

Figure 5:
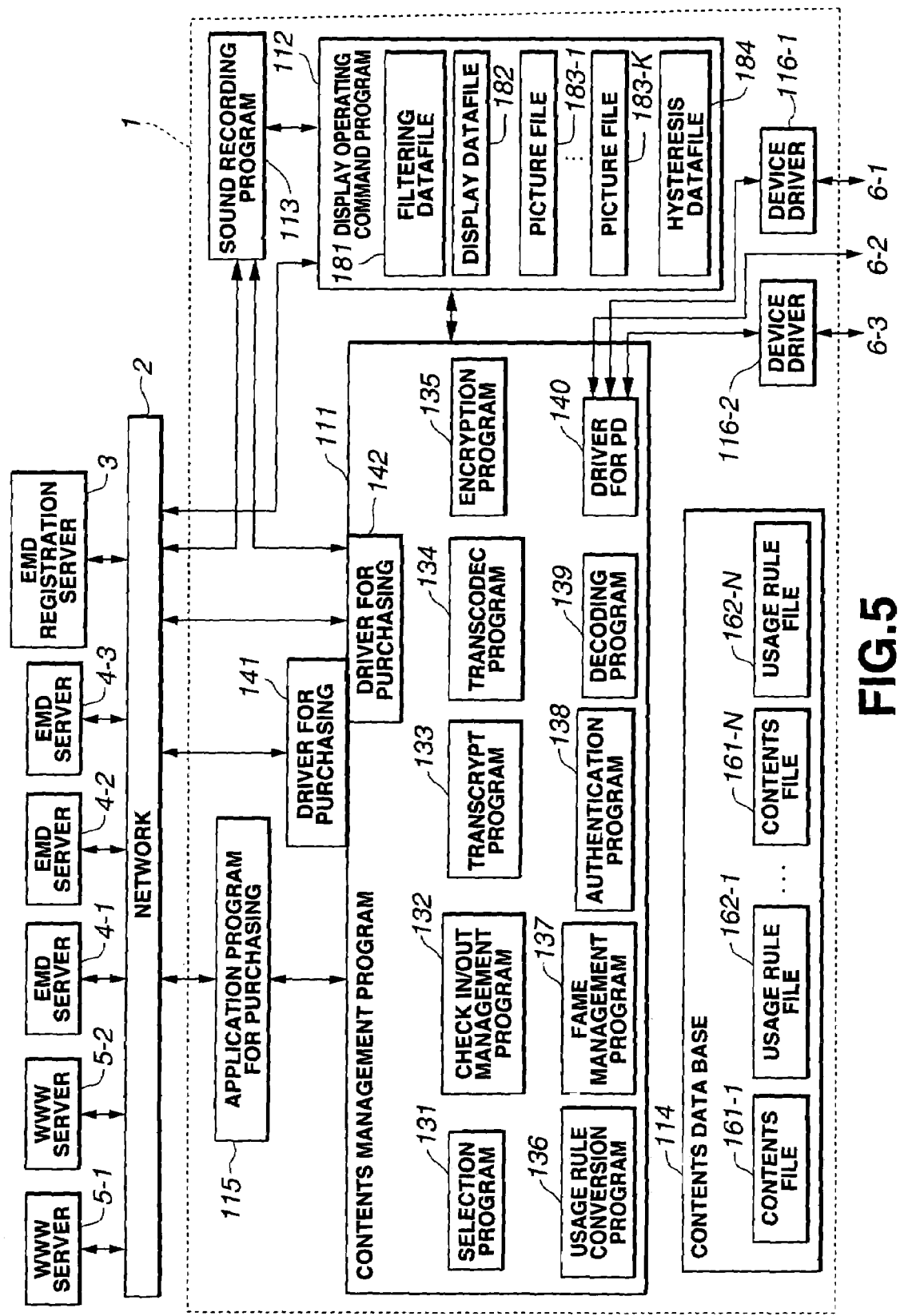
FIG. 5 is a block diagram for illustrating the structure of the function of the personal computer.

FIG. 5 is a block diagram for illustrating the function of the personal computer 1 realized on execution of a pre-set program of the CPU 11. A contents management program 111 is made up of a plurality of programs, such as an EMD selection program 131, a checkin/checkout management program 132, a transcrypt program 133, a transcodec program 134, an encryption program 135, a usage rule conversion program 136, a signature management program 137, an authentication program 138, a decoding program 139, a driver for PD 140, a driver for purchase 141 and a driver for purchase 142.

The contents management program 111 is stated by e.g., a shuffled instruction or an encrypted instruction so that the processing contents are hidden from outside to render it difficult to read the processing contents from outside, for example, so that the user is unable to identify the instruction even if the user directly reads out the contents management program 111.

The EMD selection program 131 is not included in the contents management program 111 when installing the contents management program 111 on the personal computer 1, and is received from the EMD registration server 3 over the network 2 in the EMD registration which will be explained subsequently. The EMD selection program 131 selects connection to one of the EMD servers 4-1 to 4-3 to cause an application for purchase 115 or drivers for purchase 141 or 142 to execute communication with one of the EMD servers 4-1 to 4-3, such as downloading of contents in purchasing the contents.

The checkin/checkout management program 132 sets checkin and checkout, while checking out the contents stored in contents files 161-1 to 161-N to one of the portable devices 6-1 to 6-3 or checking in the contents stored in the portable devices 6-1 to 6-3, based on the usage rule files 162-1 to 162-N recorded in a contents database 114.

The checkin/checkout management program 132 innovates data of the usage rules stored in the usage rule files 162-1 to 162-N recorded in the contents database 114 in association with the checkin or checkout processing.

The transcrypt program 133 converts the encryption system of contents received by the application for purchase 115 from the EMD server 4-1, the encryption system of contents received by the driver for purchase 141 from the EMD server 4-2 or the encryption system of contents received by the driver for purchase 142 from the EMD server 4-3 into the encryption system which is the same as the contents stored in the contents files 161-1 to 161-N recorded in the contents database 114.

When checking out the contents to the portable device 6-1 or 6-3, the transcrypt program 133 converts the checked-out contents into the encryption system which can be used by the portable device 6-1 or 6-3.

The transcodec program 134 converts the compression system for contents received by the application for purchase 115 from the EMD server 4-1, that for contents received by the driver for purchase 141 from the EMD server 4-2 and that for contents received by the driver for purchase 142 from the EMD server 4-3 into the compression system which is the same as that of the contents stored in the contents files 161-1 to 161-N recorded by the contents database 114.

The transcodec program 134 encodes the contents read out from e.g., a CD and sent from a recording program 113 in an uncompressed form in accordance with the same encoding system as that for the contents stored in the contents files 161-1 to 161-N recorded by the contents database 114.

When checking out contents to the portable device 6-1 or 6-3, the transcodec program 134 converts the checked-out contents into a compression system that can be used by the portable device 6-1 or 6-3.

The encryption program 135 encrypts the non-encrypted contents read from a CD and sent from the recording program 113 in accordance with the encryption system which is the same as of the contents stored in the contents files 161-1 to 161-N recorded on the contents database 114.

The usage rule conversion program 136 converts the format of the data indicating usage rules for contents received by the application for purchase 115 over the network 2 from the EMD server 4-1, or so-called Usage Rule, the data indicating usage rules for contents received by the driver for purchase 141 over the network 2 from the EMD server 4-2 or the data indicating usage rules for contents received by the driver for purchase 142 over the network 2 from the EMD server 4-3, into the same format as the usage rule data stored in the usage rule files 162-1 to 162-N recorded by the contents database 114.

On the other hand, the usage rule conversion program 136 when checking out contents to the portable device 6-1 or 6-3 converts the usage rule data corresponding to the contents to be checked out into the usage rule data that may be used by the portable device 6-1 or 6-3.

The signature management program 137 before processing for checkin or checkout detects possible falsification of the usage rule data based on the signature contained in the usage rule data stored in the usage rule files 162-1 to 162-N recorded in the contents database 114. The signature will be explained later on. The signature management program 137 innovates the signature contained in the usage rule data in association with updating of the usage rule data stored in the usage rule files 162-1 to 162-N recorded in the contents database 114 as a result of the checkin or checkout processing.

The authentication program 138 executes the processing for reciprocal authentication between the contents management program 111 and the application for purchase 115 and the processing fore reciprocal authentication between the contents management program 111 and the driver for purchase 141. The authentication program 138 memorizes an authentication key used in the processing of reciprocal authentication between the EMD server 4-1 and the application for purchase 115, that between the EMD server 4-2 and the driver for purchase 141 and that between the EMD server 4-3 and the driver for purchase 142.

The authentication key used by the authentication program 138 in the processing of reciprocal authentication is not stored in the authentication program 138 when the contents management program 111 is installed on the personal computer 1. The authentication key is supplied from the EMD registration server 3 and memorized in the authentication program 138 when the registration processing is regularly executed by a display operation command program 112.

When the contents stored in the contents files 161-1 to 161-N recorded by the contents database 114 are reproduced by the personal computer 1, the decoding program 139 decodes the contents.

When checking out pre-set contents to the portable device 6-2 or checking in pre-set contents from the portable device 6-2, the driver for PD 140 sends contents or commands for causing the portable device 6-2 to execute pre-set processing to the portable device 6-2.

When checking out pre-set contents to the portable device 6-1 or checking in pre-set contents from the portable device 6-1, the driver for PD 140 sends contents or commands for causing a device driver 116-1 to execute pre-set processing to the device driver 116-1.

When checking out pre-set contents to the portable device 6-3 or checking in pre-set contents from the portable device 6-3, the driver for PD 140 sends contents or commands for causing a device driver 116-2 to execute pre-set processing to the device driver 116-2.

The driver for purchase 141 is a so-called plug-in program which is installed along with the contents management program 111 and which is supplied from the EMD registration server 3 over the network 2 or is supplied as it is recorded on a pre-set CD.

The driver for purchase 141 requests transmission of pre-set contents to the EMD server 4-2 over the network 2, while receiving contents from the EMD server 4-2. When receiving contents from the EMD server 4-2, the driver for purchase 141 executes processing for billing.

The driver for purchase 142 is a program installed along with the contents management program 111 and requests transmission of pre-set contents from the EMD server 4-3 while receiving contents from the EMD server 4-3. The driver for purchase 142 when receiving the contents from the EMD server 4-3 executes the processing for billing.

The display operation command program 112 demonstrates a picture of a pre-set window in a display 20, based on a filtering data file 181, a display data file 182, picture files 183-1 to 183-k, or a hysteresis data file 184, and commands the contents management program 111 to execute processing, such as checkin or checkout, based on the operation on the keyboard 18 or the mouse 19.

The filtering data file 181, recorded on the HDD 21, stores data used for weighting the contents stored in the contents files 161-1 to 161-N recorded in the contents database 114.

The display data file 182, recorded on the HDD 21, stores data corresponding to contents stored in the contents files 161-1 to 161-N recorded in the contents database 114.

The picture files 183-1 to 183-k, recorded on the HDD 21, stores pictures corresponding to the contents files 161-1 to 161-N recorded in the contents database 114 or pictures corresponding to a package as later explained.

If there is no necessity for differentiating the picture files 183-1 to 183-k from one another, these will be referred to simply as picture files 183.

The hysteresis data file 184, recorded on the HDD 21, stores hysteresis data, such as the number of times the contents stored in the contents files 161-1 to 161-N recorded on the contents database 114 have been checked in or checked out, and the dates of the checkin or checkout.

The display operation command program 112 when performing the registration processing transmits an ID of the previously stored contents management program 111 to the EMD registration server 3 over the network 2 and also receives the authentication key and the EMD selection program 131 from the EMD registration server 3 to send the authentication key and the EMD selection program 131 to the contents management program 111.

The recording program 113 demonstrates a picture of a pre-set window and reads out data such as contents recording time from an optical disc 42 loaded on the drive as a CD based on the actuation on the keyboard 18 or the mouse 19.

The recording program 113 requests the WWW server 5-1 or 5-2 to transmit data corresponding to the contents recorded on the CD, such as the name of the album or the name of an artist, or data corresponding to the contents recorded on the CD, such as title of the musical number, based on e.g., the recording time of the contents recorded on the CD, while receiving data corresponding to the CD or data corresponding to the contents recorded on the CD, from the WWW server 5-1 or 5-2.

The recording program 113 sends the data corresponding to the received CD or data corresponding to the contents recorded on the CD to the display operation command program 112.

When fed with a command for recording, the recording program 113 reads out the contents from the CD as an optical disc 42 loaded on the drive 22 to output the read-out contents to the contents management program 111.

The contents database 114 stores the contents, supplied from the contents management program 111, in the state in which the contents are compressed and encrypted in pre-set compression and encryption systems, in one of the contents files 161-1 to 161-N, by way of recording the contents on the HDD 21. The contents database 114 stores the usage rule data, corresponding to the contents stored in the contents files 161-1 to 161-N, in one of the usage rule files 162-1 to 162-N associated with the contents files 161-1 to 161-N, having the contents stored therein, respectively, by way of recording on the HDD 21.

It is possible for the contents database 114 to record the contents files 161-1 to 161-N or the usage rule files 162-1 to 162-N as records.

For example, the usage rule data corresponding to the contents stored in the contents file 161-1 is stored in the usage rule file 162-1. The usage rule data corresponding to the contents stored in the contents file 161-N is stored in the usage rule file 162-N.

The data recorded in the usage rule files 162-1 to 162-N corresponds to the data recorded on a terminal database or to data recorded on a musical number database. That is, the contents database 114 is constructed to encompass the terminal database and the musical number database, which will be explained subsequently.

In the following, if there is no necessity of differentiating the contents files 161-1 to 161-N from one another, these will simply be referred to as a contents file 161. Similarly, if there is no necessity of differentiating the usage rule files 162-1 to 162-N from one another, these will simply be referred to as a usage rule file 162.

The application for purchase 115 is supplied from the EMD registration server 3 through the network 2 or supplied as it is recorded on a pre-set CD. The application for purchase 115 requests the EMD server 4-1 to transmit pre-set contents through the network, while receiving the contents from the EMD server 4-1 to send the received contents to the contents management program 111. When receiving the contents from the EMD server 4-1, the application for purchase 115 executes billing processing.

The correlation of data stored in a display data file 82 and the contents files 161-1 to 161-N stored in the contents database is hereinafter explained.

The contents stored in one of the contents files 161-1 to 161-N belong to a pre-set package. More specifically, the package is one of the original package, mt select package and the filtering package.

The original package, to which one or more contents belong, is associated with the classification of contents in the EMD servers 4-1 to 4-3, such as a so-called album, or with a sole CD. The contents belong to some original package and cannot belong to plural original packages. The original package, to which the contents belong, cannot be changed. The user is able to edit part of the information associated with the original package (that is, add the information or change the added information).

To a my-select package belong one or more contents optionally selected by the user. The ser is able to optionally select which contents belong to the my-select package. The contents can belong to one or more my-select packages simultaneously. On the other hand, it is unnecessary for the contents to belong to some my-select package.

To the filtering package belong the contents selected based on the filtering data stored in the filtering data file 181. The filtering data is furnished from the EMD servers 4-1 to 4-3 or the WWW server 5-1 or 5-2 through the network 2, or is furnished as the data is recorded on a pre-set CD. The user is also able to edit the filtering data stored in the filtering data file 181.

The filtering data serves as a reference for calculating pre-set contents or calculating the weight for the contents. For example, if the filtering data corresponding to the best ten of J-POP (Japanese Pops) for the current week is used, the personal computer 1 is able to specify the contents of the rank 1 up to the rank 10 of the Japanese pops for the current week.

In the filtering data file 181, there are, for example, filtering data for selecting the contents in the order of the diminishing checkout period for the past one month, filtering data for selecting the contents with the larger number of times of checkout during the past half-year period and filtering data for selecting contents including the word "love" in the name of the musical number.

In this manner, the contents of the filtering package are selected by associating the filtering data with contents displaying data 221 corresponding to contents (including data set by the user in the contents displaying data 221) or with a hysteresis data 184.

Figure 6:
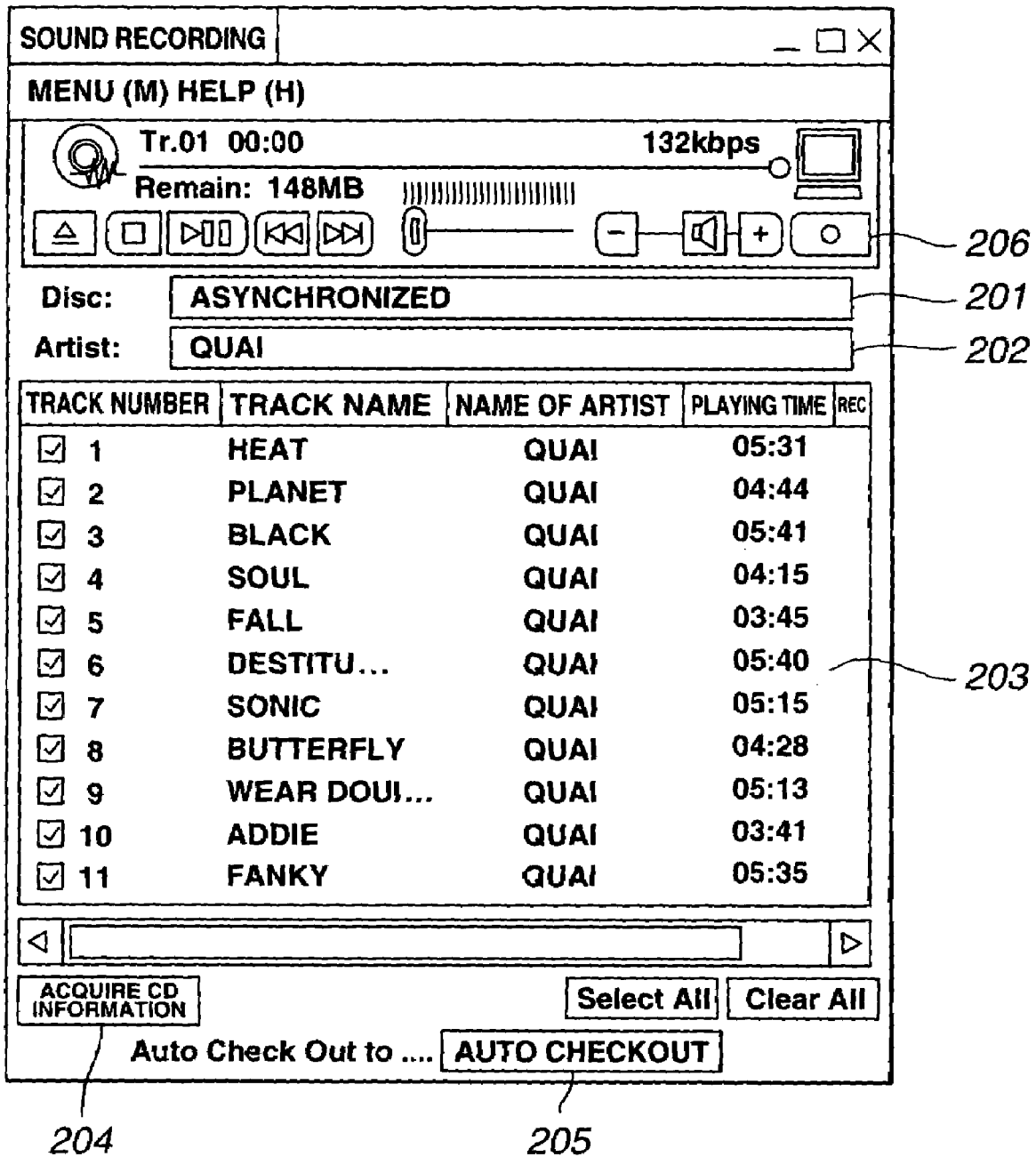
FIG. 6 illustrates an example of a window which a recording program in the personal computer demonstrates on a display.

FIG. 6 illustrates a window which the recording program 113 demonstrates on the display 20 when the CD information is received from the WWW server 5-2. Based on the CD information received from the WWW server 5-2, the recording program 113 demonstrates the CD title, such as "asynchronized", on a field 201. Based on the CD information received from the WWW server 5-2, the recording program 113 demonstrates the name of an artist, such as "Quai", on a field 202.

Based on the CD information received from the WWW server 5-2, the recording program 113 demonstrates the name of a musical number, such as "heat", "planet", "black" or "soul" on the number name demonstrating portion of a field 203. Similarly, the recording program 113 demonstrates the name of the artist, such as "Quai", in the artist name demonstrating portion of the field 203.

After reception of the pre-set CD information by the recording program 113, the latter stores the CD information in a pre-set directory of the HDD 21.

When e.g., a button 204 is clicked to issue a command for acquiring the CD information, the recording program 113 first retrieves a pre-set directory of the HDD 21. If the CD information is stored in the directory, the recording program 113 demonstrates a dialog box, not shown, to cause the user to select whether or not the CD information stored in the directory is to be used.

If a button 206 for commanding the start of recording of contents arranged in a window displayed by the recording program 113, the recording program 113 reads out the contents from the CD stored in the drive 22 to send the contents read out from the CD along with the CD information to the contents management program 111. The transcodec program 134 of the contents management program 111 compresses the contents supplied from the recording program 113 in accordance with a pre-set compression system. The encryption program 135 encrypts the compressed contents. The usage rule conversion program 136 generates the usage rule data corresponding to the encrypted contents.

The contents management program 111 sends the compressed and encrypted contents along with the usage rule data to the contents database 114.

The contents database 114 generates a contents file 161 and a usage rule file 162, corresponding to the contents received from the contents management program 111, and stores the contents and the usage rule data in the contents file 161 and in the usage rule file 162.

When the contents and data of the usage rules corresponding to the contents are stored in the contents database 114, the contents management program 111 sends the CD information and the usage rule data received from the recording program 113 to the display operation command program 112.

The display operation command program 112 generates original package displaying data 201 and contents displaying data 221, based on the CD information and the usage rule data corresponding to the contents stored in the contents database 114 in the recording processing.

In the window displayed by the recording program 113, there is arranged a button 205 adapted for automatically setting whether or not the contents read out from the CD are to be checked out in one of the portable devices 6-1 to 6-3 read out from the CD, when the contents read out from the CD are recorded on the contents database 114.

For example, if the button 205 is clicked, the recording program 113 demonstrates a pulldown menu showing a list of the portable devices 6-1 to 6-3. When the user has selected one of the portable devices 6-1 to 6-3 from its pulldown menu, the personal computer 1 automatically checks in or checks out the contents recorded from the CD in of from the selected portable devices 6-1 to 6-3. If the user has selected the "no checkout" from the pull-down menu, the personal computer per 1 forms no checkout when contents are recorded from the CD.

Referring to the flowchart of FIG. 7, the processing of transmitting the music data reproduced from the CD loaded on the drive 22 to the HDD 21 to copy the data, by the CPU 11 executing the recording program 113, is hereinafter explained. When the user actuates the keyboard 18 or the mouse 19 to input to the CPU 11 a command of transmitting the music data reproduced from the CD, not shown, loaded on the drive 22, to the HDD 21 for copying, over the interface 17, the CPU 11 at step S11 causes the GUI (Graphical User Interface) for selecting the number to be copied on the display 20 through the interface 17.

Specifically, the CPU 11 reads-in the TOC (Table-of-Contents) of the CD loaded on the drive 22 to acquire the information on the musical number contained in the CD to demonstrate the information on the display 20. Alternatively, the CPU 11 reads out the ISRC (International Standard Recording Code) for each musical number contained in the CD to acquire the information on the musical number to demonstrate the information on the display 20. Still alternatively, the CPU 11 accesses the WWW server 5-1 or 5-2 over the network 2 to acquire the information of the musical number of the CD to demonstrate the corresponding GUI on the display 20. The user uses the GUI of the display 20 to actuate the keyboard 18 or the key 19 to select the number to be copied.

At the next step S12, the CPU 11 checks the terminal database stored in the HDD 21. This terminal database corresponds to the usage rule files 162-1 to 162-N of the contents database 114 shown in FIG. 5. The processing for checking this terminal database is shown in detail in the flowchart of FIG. 8.

At step S31, the CPU 11 cooperates with the CPU 32 of the adapter 26 to compute hash values of the entire terminal database. At step S32, the CPU 11 compares the calculated values to the previously stored hash value.

Meanwhile, if no data is recorded in the terminal database, the CPU 11 computes no hash values.

Figures 9, 10:
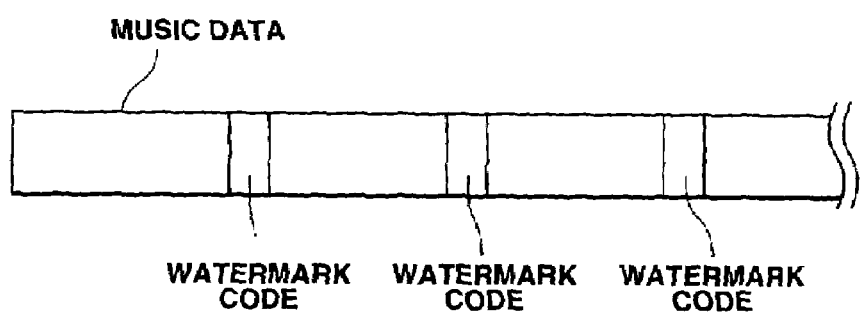
FIG. 9 shows an example of a terminal database.
FIG. 10 illustrates a watermark.

That is, there is formed a terminal database in the HDD 21. In this terminal database, the ISRC of previously recorded music numbers and the date and time of the copying are recorded in association with each other as the information for supervising the music data recorded on the HDD 21, as shown in FIG. 9. The hash values of the entire terminal database, based on the respective ISRCs and the date and time of copying of the entire numbers recorded in the terminal database are computed at step S38 by the CPU 32 of the adapter 26 at step S38 and are recorded in the non-volatile memory 34. The hash values are obtained by applying a hash function to the data. The hash function in general is a unidirectional function for mapping data of variable lengths to values of short fixed length and has properties that collision between hash values is not likely to take place. Examples of the hash functions are SHA (Secure Hash Algorithm) and MD (Message Digest) 5. The CPU 11 at step S31 computes hash values in the same way as the CPU 32. The CPU 11 at step S32 requests the CPU 32 to read out the hash values stored in the non-volatile memory 34 to compare at step S31 the transferred hash values with the hash values the CPU 11 has just calculated.

At step S33, the CPU 11 verifies whether or not the hash values just calculated at step S31 coincide with the last hash values of the terminal database stored in the non-volatile memory 34. If the hash values are not coincident, the CPU 11 verifies that the terminal database has been altered with malignant intention. Thus, the CPU 11 at step S34 generates a message reading: "since the terminal database has been altered, copying is not possible" to output the message via the interface 17 to the display 20 for display thereon. The CPU 11 then terminates the processing. That is, in this case, the processing of reproducing music data recorded on the CD for copying on the HDD 21 is prohibited.

If the hash value computed at step S31 coincides with the previous hash value, the program moves to step S35, where the CPU 11 acquires the ISRC of the number selected as number for copying specified at step S11 (selected music number), from the CD. If no ISRC is recorded on the CD, the CPU 11 reads out the TOC data of the CD and applies the hash function to the data to acquire data of a suitable length, such as 58 bits, to use the data in place of the ISRC.

At step S36, the CPU 11 verifies whether or not the ISRC acquired at step S35 (that is the selected music number) has been registered in the terminal database (FIG. 9). If the ISRC is not registered in the terminal database, the music number is not recorded as yet in the HDD 21. Thus, the program moves to step S37, where the CPU 11 registers the ISRC of the music number and the current time and date in the terminal database. Meanwhile, the CPU 11 exploits the output value of the RTC 35 of the adapter 26 transferred from the CPU 32. At step S38, the CPU 11 reads out data of the terminal database at the time point to transfer the read-out data to the CPU 32 of the adapter 26. The CPU 32 calculates the hash value of the transfer data to store the calculated hash value in the non-volatile memory 34. This hash value, thus stored, is compared at step S32 to the previously stored hash value.

Then, at step S39, the CPU 11 sets an unregistered flag specifying that the selected number has not been registered in the terminal database. This flag is used at the step S13 of FIG. 7, as later explained, to check whether or not the selected music number has been registered in the terminal database.

If, at step S36, the ISRC of the selected music number is verified to be registered in the terminal database, the selected music number is the music number registered at least once in the HDD 21. Thus, in this case, the program moves to step S40 where the CPU 11 checks whether or not the current date and time (current date and time outputted by the RTC 35 of the adapter 26) is not less than 48 hours ahead the date and time of registration of the selected music number registered in the terminal database. If the current time is ahead the date and time of registration by not less than 48 hours, the music number has been registered at least once on the HDD 21. However, since the time of 48 hours or more elapsed since the music number was registered, there is no particular harm if the music number is copied again. Thus, in this case, the copying on the HDD 21 is allowed. Therefore, the program moves to step S41 where the CPU 11 changes the date and time of the terminal database from the past date and time of registration to the current date and time (date and time outputted by the RTC 35). The program then reverts to step S38 where the CPU 11 causes the CPU 32 to compute the hash value of the entire terminal database for storage in the non-volatile memory 34. The CPU 11 at step S39 sets an "unregistered" flag for the music number.

On the other hand, if it is found at step S40 that the current time is not ahead by not less than 48 hours as from the date and time of registration, the copying of the selected music number on the HDD 21 is prohibited. In this case, the program moves to step S42 where the CPU 11 sets the "registered" flag for the selected music number.

In this manner, there is set by the terminal database check processing indicating whether or not a flag indicating that the selected music number has been registered in the HDD 21.

Figure 7:
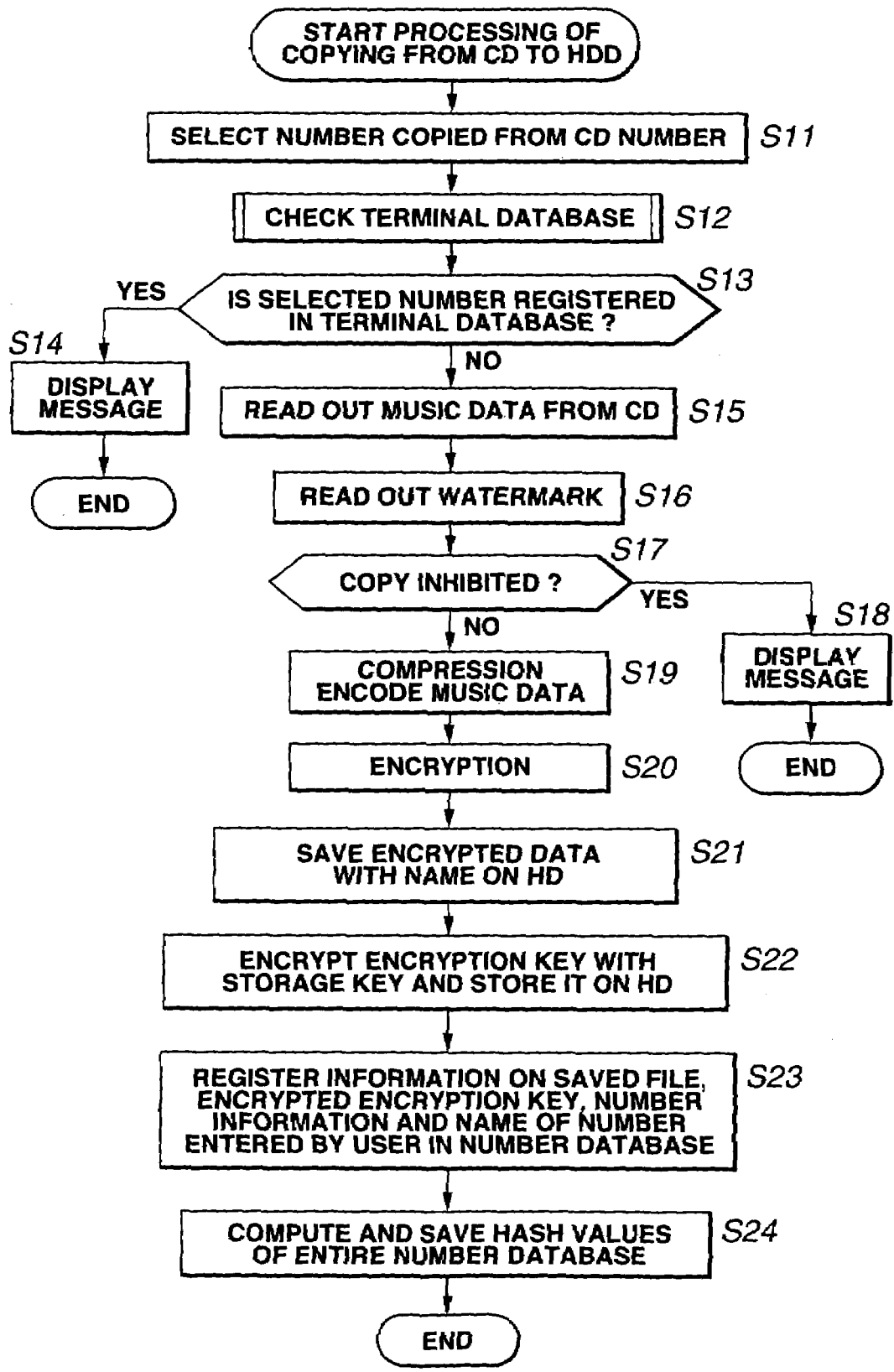
FIG. 7 is a flowchart for illustrating the processing of copying from a compact disc to a HDD in the personal computer.

Reverting to FIG. 7, at step S13 the CPU 11 verifies, from the above-mentioned flag, whether or not the selected music number has already been registered in the terminal database. If the selected music number has been registered, the program moves to step S14, where the CPU 11 causes the display 20 to demonstrate a message reading: "The time not less than 48 hours has not elapsed since this music number was copied once and so the music number cannot be copied". This allows the user to comprehend the reason why the music number may not be copied on the HDD 21.

If, at step S13, the selected music number has been verified not to be registered in the terminal database, the program moves to step S115, where the CPU 11 controls the drive 22 to read out the music data from the CD loaded therein. In this music data, a watermark code is inserted at a pre-set position, as shown in FIG. 10. At step S16, the CPU 11 extracts the watermark code contained in the music data to verify at step S17 whether or not the watermark code indicates copying inhibition. If the watermark code indicates copying inhibition, the program moves to step S18 where the CPU 11 causes a message reading: "copying in inhibited" to be demonstrated on the display 20 via the interface 17 to terminate the copying processing.

If conversely it has been found at step S17 that the watermark is not indicating copying inhibition, the program moves to step S19 where the CPU 11 compresses music data by software processing in accordance with, for example, ATRAC (Adaptive Transform Acoustic Coding, registered trademark) system. At step S20, the CPU 11 encrypts the music data, using the pre-set cryptographic key stored in the memory 13, in accordance with the encrypting methods, such as data encryption standard system (DES) or the fast encipherment algorithm (FEAL) system. The cryptographic key may also be a random number generated by software or a random number generated by the CPU 32 of the adapter 26. By performing the encryption processing not only by the personal computer 1 alone but also by cooperation between the personal computer 1 and the CPU 32 of the adapter 26 in executing the encryption processing, it is possible to realize encryption which renders deciphering more difficult.

Then, at step S21, the CPU 11 causes the encrypted data to be transferred to the HDD 21 to store the encrypted data as a file along with a filename. Alternatively, the position information of the filename, such as is given by the number of bytes from the leading end, may be accorded as a part of the file for storage.

This storage processing may be performed independently of or simultaneously with the above-mentioned encoding and encryption processing.

At step S22, the CPU 11 uses the storage key memorized in the pre-set RAM 13 to cipher the encryption key obtained on encrypting the music data, in accordance with the aforementioned DES or FEAL system, to store the encryption key in the music number database of the HDD 21. It is noted that the storage key is stored in such a manner as to render reading difficult if the readout method used is illicit, and that the music number database of the HDD 21 corresponds to the usage rule files 162-1 to 162-N of the contents database 114 shown in FIG. 5.

At step S23, the CPU 11 groups together the information on the stored files, encrypted encryption key, information on the music number and the information on the name of the music number, inputted by the user, as a set, and registers the set in a music number database of the HDD 21. At step S24, the CPU 11 causes the CPU 32 to compute the hash value of the entire music number database for storage in the non-volatile memory 34.

In this manner, the music number database, shown for example in FIG. 11, is registered on the HDD 21. In the present case, there are recorded filenames of the items 1 to 3, encrypted encryption key, name of the music number, duration of the music number, playback conditions (date and time of start and end and limitation on the number of times), a number of times of playback counter, playback time billing condition, copying conditions (number of times), a number of times of copying counter and copying conditions (SCMS).

Since re-duplication becomes possible after a pre-set time lapse as from the time of duplication, a plural number of times of duplication, allowed for a user as a private person, becomes possible. If conversely a large number of duplication is to be attempted, the operation is extremely time-consuming and becomes practically impossible. For example, if the personal computer 1 is in trouble, such that the contents recorded on the HDD 21 have been erased, it is possible to re-duplicate the erased contents after lapse of a pre-set time to record the contents on the HDD 21.

The contents of the terminal database, recorded on the HDD 21, can be co-owned through the network 2.

In the foregoing description, the date and time of duplication has been stored in association with the ISRC. Alternatively, the other information identifying the contents or the CD, such as the title of the musical number, an album name etc may also be used.

Figure 12A:
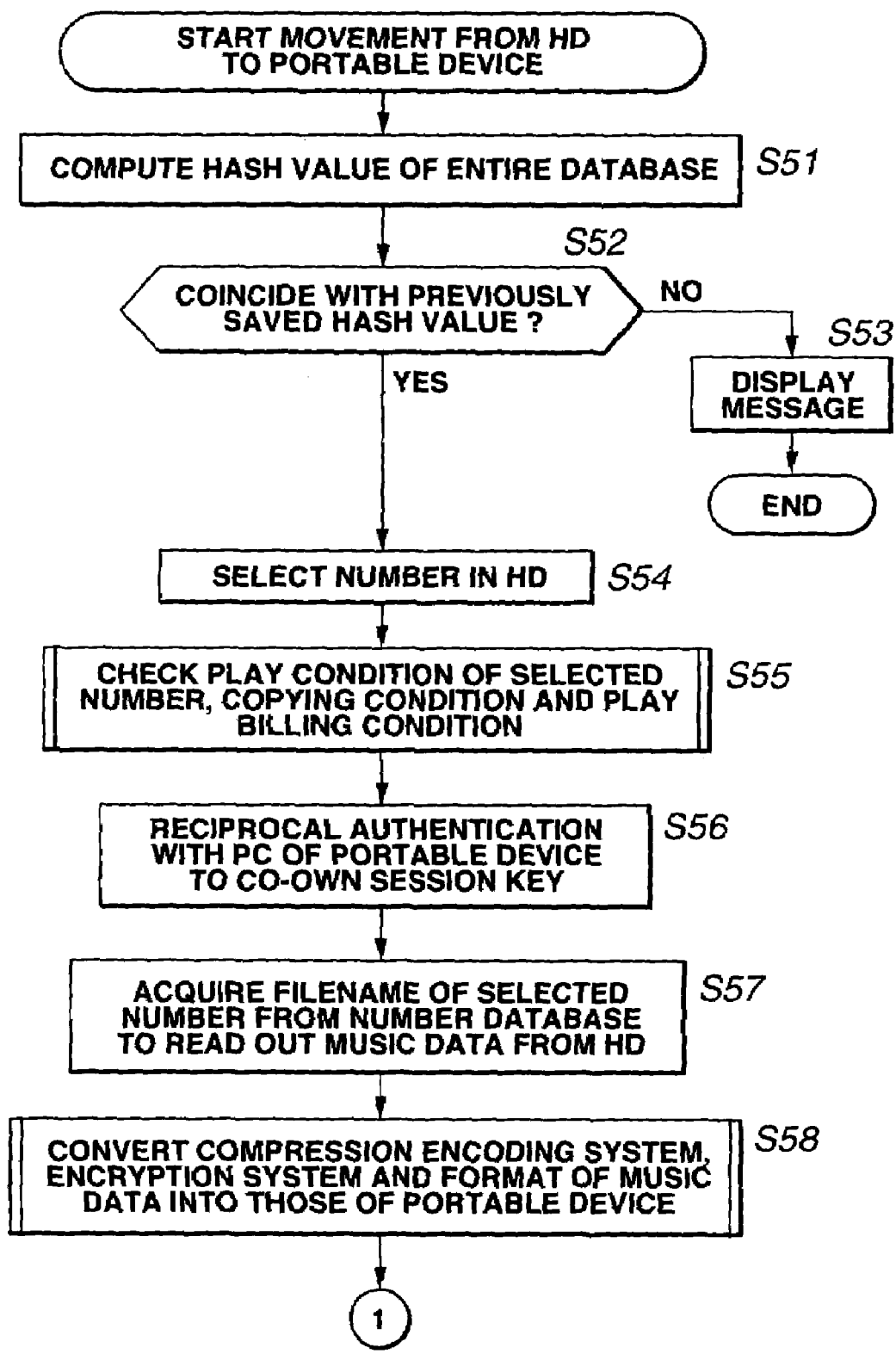
FIGS. 12A, 12B and 12C show flowcharts for illustrating details of an operation of moving data from an HDD to a portable device.
Figure 12B:
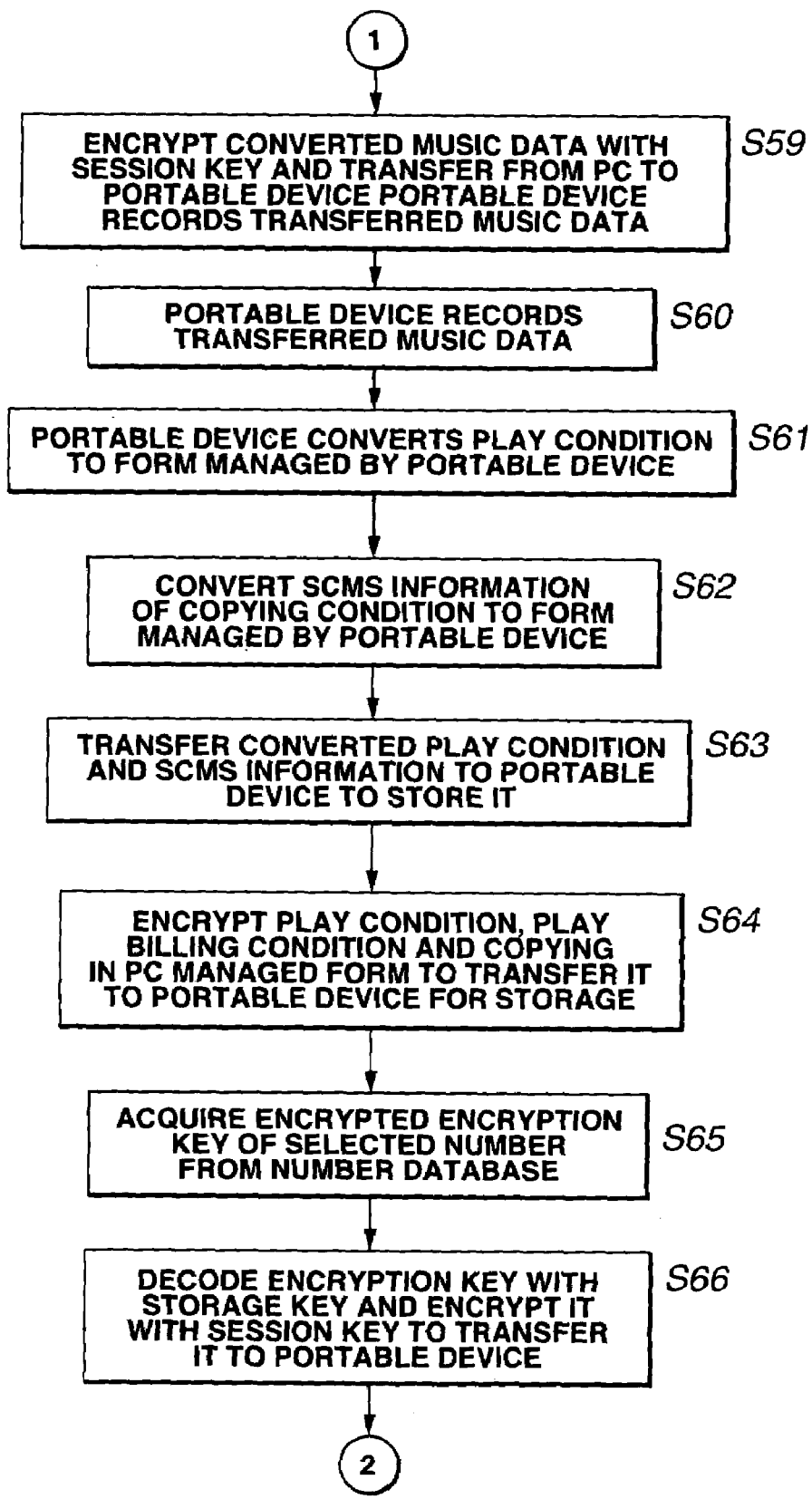
Figure 12C:
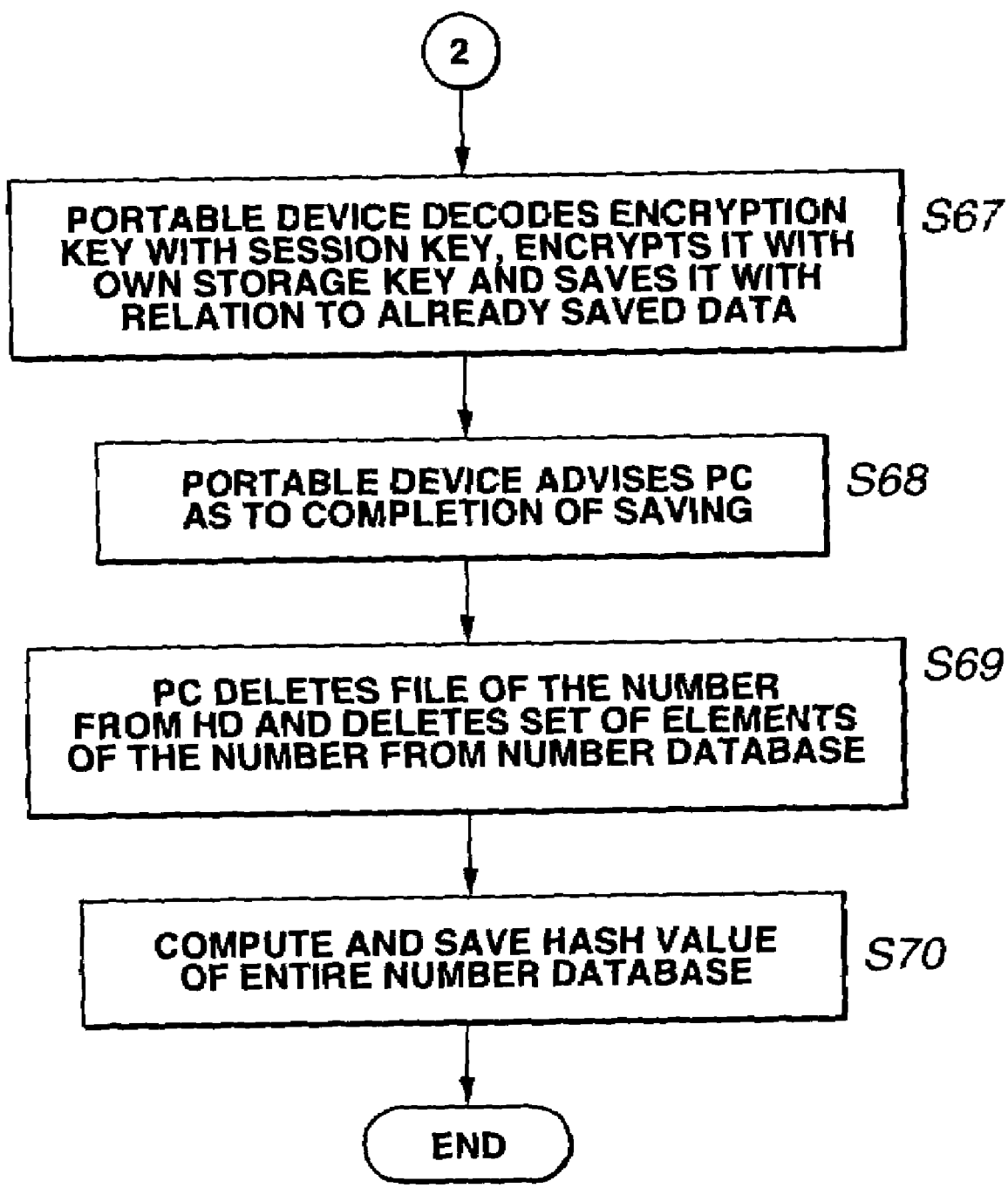

Referring to the flowchart of FIGS. 12A to 12C, the processing of moving music data from the HDD 21 to the flash memory 61 of the portable device 6, such as the memory stick (trademark), by the CPU 11 executing the contents management program 111 and by the CPU 53 executing the main program, is explained. At step S51, the CPU 11 computes the hash values of the entire music number database. At step S52, the CPU 11 compares the computed hash value to the hash value computed under control by the CPU 32 and stored in the non-volatile memory 34. In case of non-coincidence between the two hash values, the CPU 11 advances to step S53 to cause a message: "it is feared that the music number database has been altered with malignant intention" to be demonstrated on the display 20 to terminate the processing. The processing in this case is similar to that from steps S31 to S34 of FIG. 8. In this case, the music data is not moved from the HDD 21 to the portable device 6.

Figure 13:
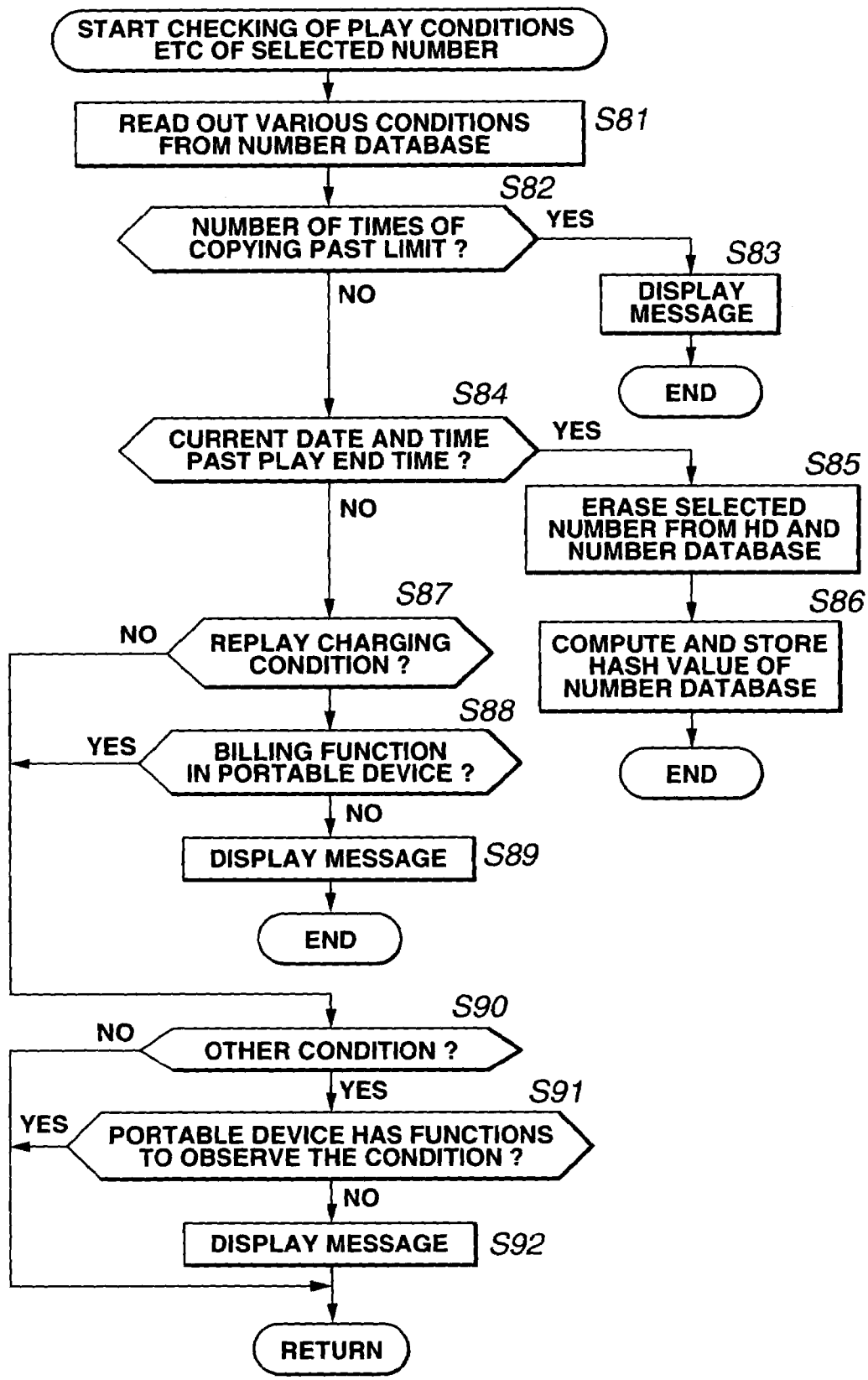
FIG. 13 is a flowchart for illustrating the operation of checking e.g., the reproduction condition of a selected musical number at step S55 in the flowchart of FIG. 12A.

Then, at step S54, the CPU 11 causes the information on the music number registered in the music number database formed in the HDD 21 for demonstration on the display 20 as the GUI for selection. Based on this GUI for selection, the user selects the music number to be moved from the HDD 21 to the portable device 6 by actuating the keyboard 18 or the mouse 19. Then, at step S55, the CPU 11 checks the playback conditions, copying conditions or the playback time billing conditions of the music number selected at step S54. This processing will be explained in detail with reference to the flowchart of FIG. 13.

Then, at step S56, authentication processing is carried out reciprocally between the CPU 11 of the personal computer 1 and the CPU 53 of the portable device 6, whereby the session key is co-owned.

It is assumed that a master key KM is pre-stored in the non-volatile memory 61 of the portable device 6 or in the EEPROM 68, and that a personal key KP and the ID are pre-stored in the RAM 13 of the personal computer 1 or in a pre-set file of the HDD 21. CPU 53 is fed from the CPU 11 with the ID pre-stored in the RAM 13 and generates a key which is the same as the personal key of the personal computer 1 stored in the RAM 13 by applying the hash function to the ID and its own master key KM. By so doing, the common personal key is co-owned by the personal computer 1 and the portable device 6. Using this personal key, it is possible to generate a transient session key.

Alternatively, the ID and the master key KMP are pre-stored in the RAM 13 of the personal computer 1, at the same time as the ID and the master key KMM of the portable device 6 are stored in the flash memory 61 of the portable device 6. The respective IDs and master keys are reciprocally transmitted so that one of the personal computer 1 and the portable device 6 applies the hash function to the ID and the master key transmitted from the other to generate its personal key. From this personal key, a transient session key is generated further.

Meanwhile, the IOS (International Organization for Standardization) 9798-2, for example, may be utilized as the authentication method.

If the reciprocal authentication has not been performed correctly, the processing comes to a close. If the reciprocal authentication has been performed correctly, at step S57, the CPU 11 reads out the filename of the selected number from the music number database, while reading out music data of the filename, such as musical data encrypted by the processing of step S20 of FIG. 2, from the HDD 21. At step S58, the CPU 11 executes the processing of converting the compression encoding system of digital music data read out at step S57 (processing of step S19), encrypting system (processing of step S20) and the format into those of the portable device 6. This converting processing will be explained subsequently in detail with reference to the flowchart of FIG. 15.

At step S59, the CPU 11 encrypts the music data, converted at step S58, with the session key co-owned by the reciprocal authentication processing of step S56, to transfer the encrypted music data to the portable device 6 over the USB port 23. At step S60, on reception of the music data transmitted over the USB connector 6, the CPU 53 of the portable device 6 causes the music data to be directly stored in the non-volatile memory 61.

At step S61, the CPU 11 converts the playback conditions (date and time of playback start and end, limitation on the number of times of playback etc) of the selected music number, registered in the music number database, into the form supervised by the portable device 6. At step S62, the CPU 11 converts the SCMS information in the copying condition registered in the music number database of the selected music number into the form supervised by the portable device 6. At step S63, the CPU 11 transfers the playback condition converted at step S61 and the SCMS information converted at step S62 to the portable device 6. The CPU 53 of the portable device 6 stores the transferred playback condition and the SCMS information in the flash memory 61.

At step S64, the CPU 11 transfers the playback condition, playback time charging conditions or the copying conditions, registered in the music number database of the selected music number, in the form in which the CPU 111 handles these conditions in the music number database, for storage in the flash memory 61.

At step S65, the CPU 11 reads out the encrypted key of the selected music number, from the music number database. At step S66, the CPU 11 decodes the encryption key with the storage key stored in the RAM 13 and encrypts the decoded storage key using the session key. The CPU 11 transfers the encryption key, encrypted with the session key, to the portable device 6.

The CPU 53 of the portable device 6 at step S67 decodes the encryption key, transferred from the personal computer 1, using the session key co-owned in the reciprocal authentication processing, and encrypts the decoded encryption key using its own key. The CPU 11 causes the encrypted encryption key to be stored in the flash memory 61 in association with the already stored data.

On termination of the storage of the encryption key, the authentication device 22 at step S68 advises the personal computer 1 that the encryption key has now been stored. On reception of this notice from the portable device 6, the CPU 11 of the personal computer 1 at step S69 deletes the file of the music data from the HDD 21, while also deleting the set of the elements of the music number from the music number database. This realizes movement instead of copying. At step S70, the CPU 11 transfers the data of the music number database to the CPU 32 of the adapter 26 to cause the CPU 32 to compute the hash value of the entire database for storage in the flash memory 61. This hash value is used at the aforementioned step S52 as the previously stored hash value.

The check processing of checking the playback condition of the selected music number at step S55 of FIG. 12A, by the CPU executing the contents management program 111 is explained. At step S81, the CPU 11 causes various conditions to be read out from the music number database. The CPU 11 at step S82 verifies whether or not the number of times of copying, among the conditions read out at step S81, has already exceeded the limit number of times of copying. If the number of times of copying has already exceeded the limit number of times of copying, the copying is no longer allowed. So, the CPU 11 advances to step S83 where the CPU 11 causes a message reading: "the number of times of copying has already exceeded the limit value", for example, to be demonstrated on the display 20 to terminate the processing. If it is verified at step S82 that the number of times of copying has not exceeded the limit number of times of copying, the program moves to step S84 to check whether or not the current date and time is past the playback end date and time. The current date and time may be that outputted by the RTC 35 of the adapter 26. This prohibits the current date and time of the personal computer 1 from being intentionally corrected by the user to past values. The CPU 11 is fed from the CPU 32 with this current date and time to give the decision of step S84 on its own. The CPU 11 may also route at step S81 the playback condition read out from the music number database to the CPU 32 of the adapter 26 to cause the CPU 32 to execute the decision processing of step S84.

If the current date and time is past the playback end date and time, the program moves to step S85, where the CPU 11 erases the selected music number from the HDD 21, at the same time as it erases the information on the selected music number from the music number database. At step S86, the CPU 11 causes the CPU 32 to calculate the hash value of the music number database to store the calculated value in the non-volatile memory 34. The processing then comes to a close. Thus, in this case, the music data is not moved.

If it is verified at step S84 that the current date and time is not past the playback end date and time, the program moves to step S87 where the CPU 11 verifies whether or not the playback time billing conditions for the selected music number (such as, for example, the fee per each reproduction), is registered in the music number database. If the playback time billing conditions are registered, the CPU 11 at step S88 communicates with the portable device 6 to check whether or not the portable device 6 has the billing function. If the portable device 6 does not have the billing function, the selected music number cannot be transmitted to the portable device 6. Thus, the CPU 11 at step S89 causes a message reading: "the destination of transfer does not have the billing function" to be demonstrated on the display 20 to terminate the moving processing for music data.

If it has been found at step S87 that the playback time billing function is not registered, or if it has been found at step S88 that the portable device 6 has the billing function, the program moves to step S90, where the CPU 11 verifies whether or not the other playback functions, such as the limit number of times of reproduction, has been registered for the selected music number. If the other playback conditions are registered, the program moves to step S91 where the CPU11 checks whether or not the portable device 6 has the function of observing these playback functions. If the portable device 6 does not have the function of observing these playback functions, the program moves to step S92 where the CPU 11 demonstrates a message reading: "the device of the destination of transfer does not have the function of observing the playback conditions" on the display 20 to terminate the processing.

If it is verified at step S90 that the playback conditions are not registered, or it is verified at step S91 that the portable device 6 lacks in the function of observing the playback conditions, the processing of checking the playback conditions etc is terminated to revert to the step S56 of FIG. 12A.

FIG. 14 shows an example of the playback conditions supervised by the portable device 6, that is the playback conditions that can be observed by the portable device 6. In the present example, the playback start date and time and playback end date and time are registered for each number of the items 1 to 3, however, the number of times of playback is registered only for the item 2, while it is not registered for the items 1 nor 3. Thus, if the music number of the item 2 is selected, the playback conditions for the number of times of playback can be observed, however, if the music number of the item 1 or 3 is selected, the playback conditions for the number of times of playback cannot be observed.

Figure 15:
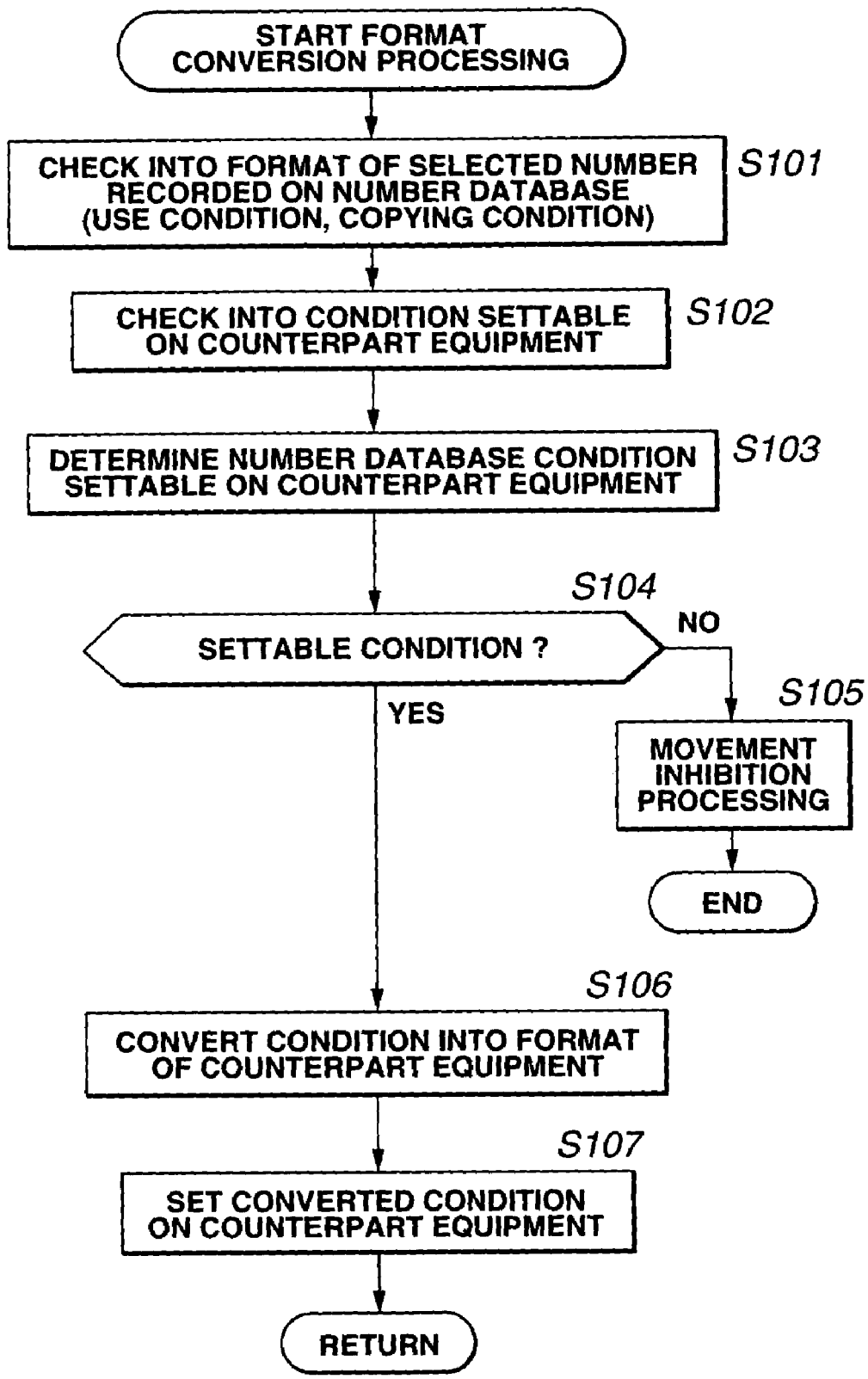
FIG. 15 is a flowchart for illustrating details of the format conversion processing at step S58 in the flowchart of FIG. 12A.

Referring to the flowchart of FIG. 15, the format conversion processing at step S58 of FIG. 12A, by the CPU 11 executing the contents management program 111, is explained in detail. At step S101, the CPU 11 checks the format of the selected music number recorded on the HDD 21 (playback conditions, usage rules or copying conditions). At step S102, the CPU 11 checks the condition that can be set on the counterpart equipment, here the portable device 6. That is, the CPU 11 inquires into the conditions that can be set on the CPU 53 of the portable device 6 and acquires a response. The CPU 11 at step S103 gives a decision based on the format condition registered in the music number database, and which can be set on the counterpart equipment, as checked at step S102.

At step S104, the CPU 11 decides whether or not there is any condition that can be set. If there is no condition that can be set, the program moves to step S105 where the CPU 11 inhibits the processing of moving the music data to the portable device 6. That is, since the portable device 6 cannot observe the condition registered in the music number database, the portable device 6 is prohibited from moving the music data.

If it is verified that there is a condition that can be set at step S104, the CPU 11 advances to step S106 where the CPU 11 converts the condition to that of the functional format condition of the counterpart device. At step S107, the CPU 11 sets the converted conditions on the counterpart equipment. As a result, the portable device 6 is able to reproduce the music data in accordance with the so-set conditions, that is under observing the so-set conditions.

Figure 16A:
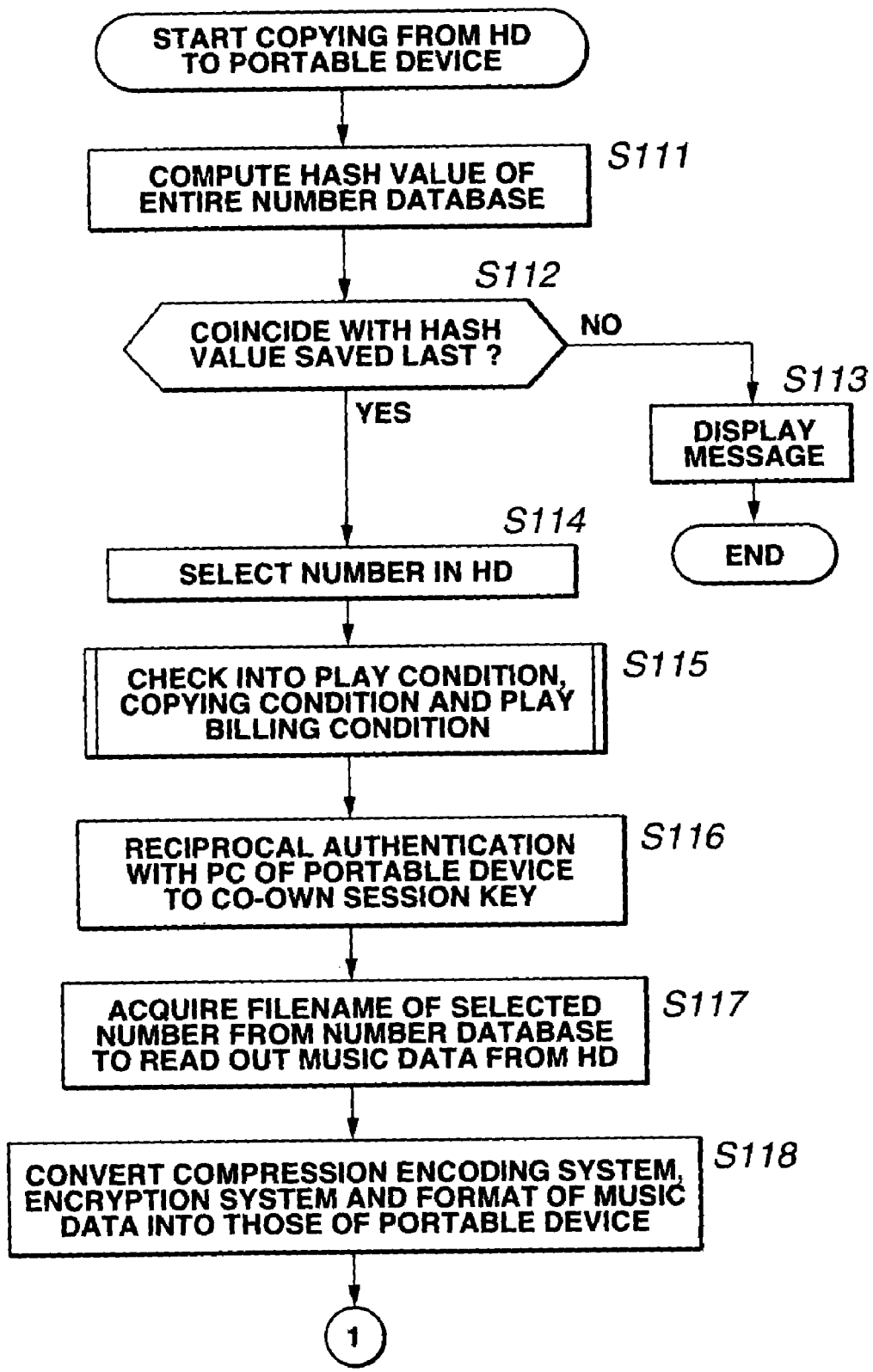
FIGS. 16A, 16B and 16C are flowcharts for illustrating the operation of copying data from an HDD 21 to a portable device 6.
Figure 16B:
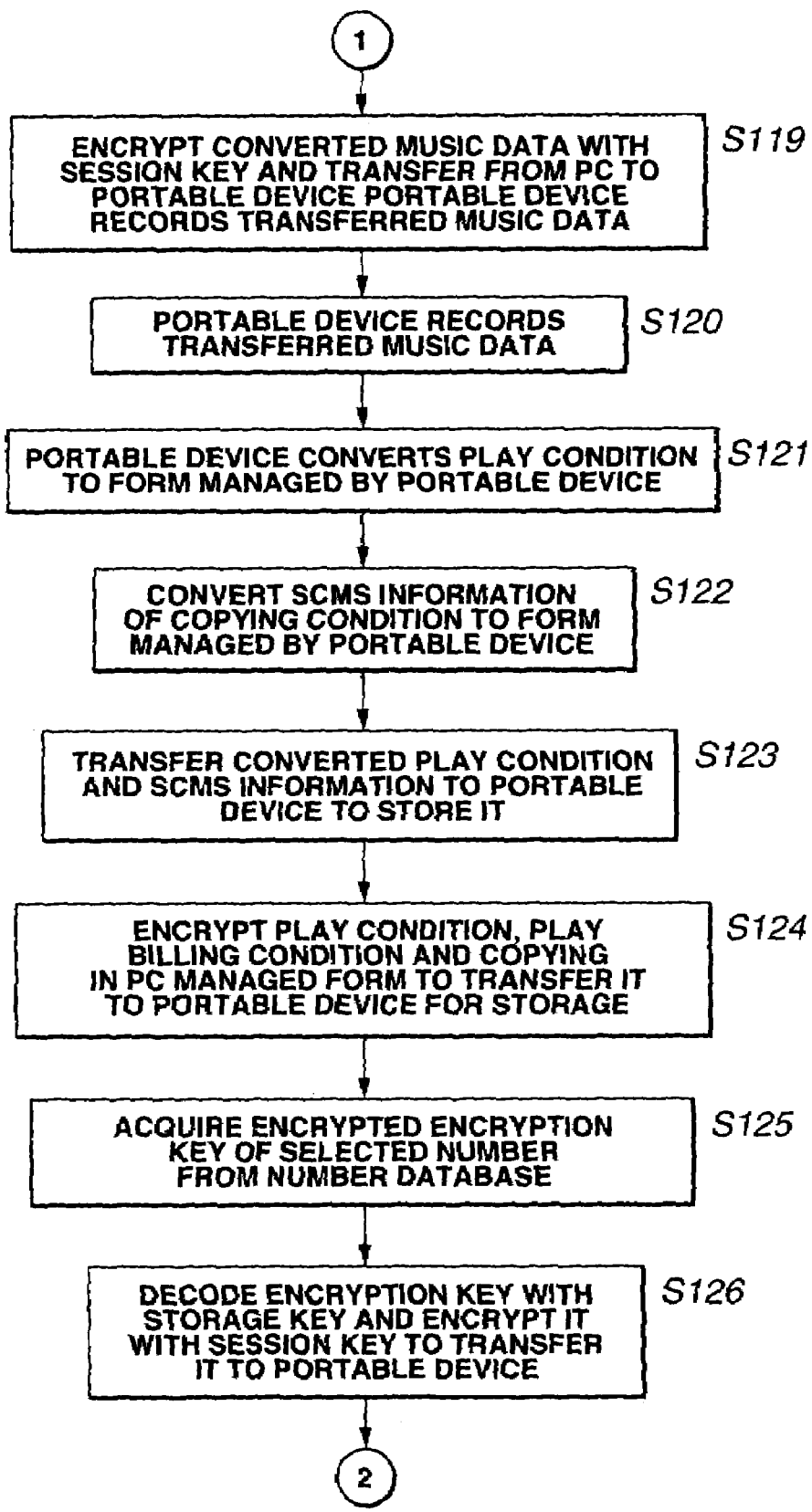
Figure 16C:
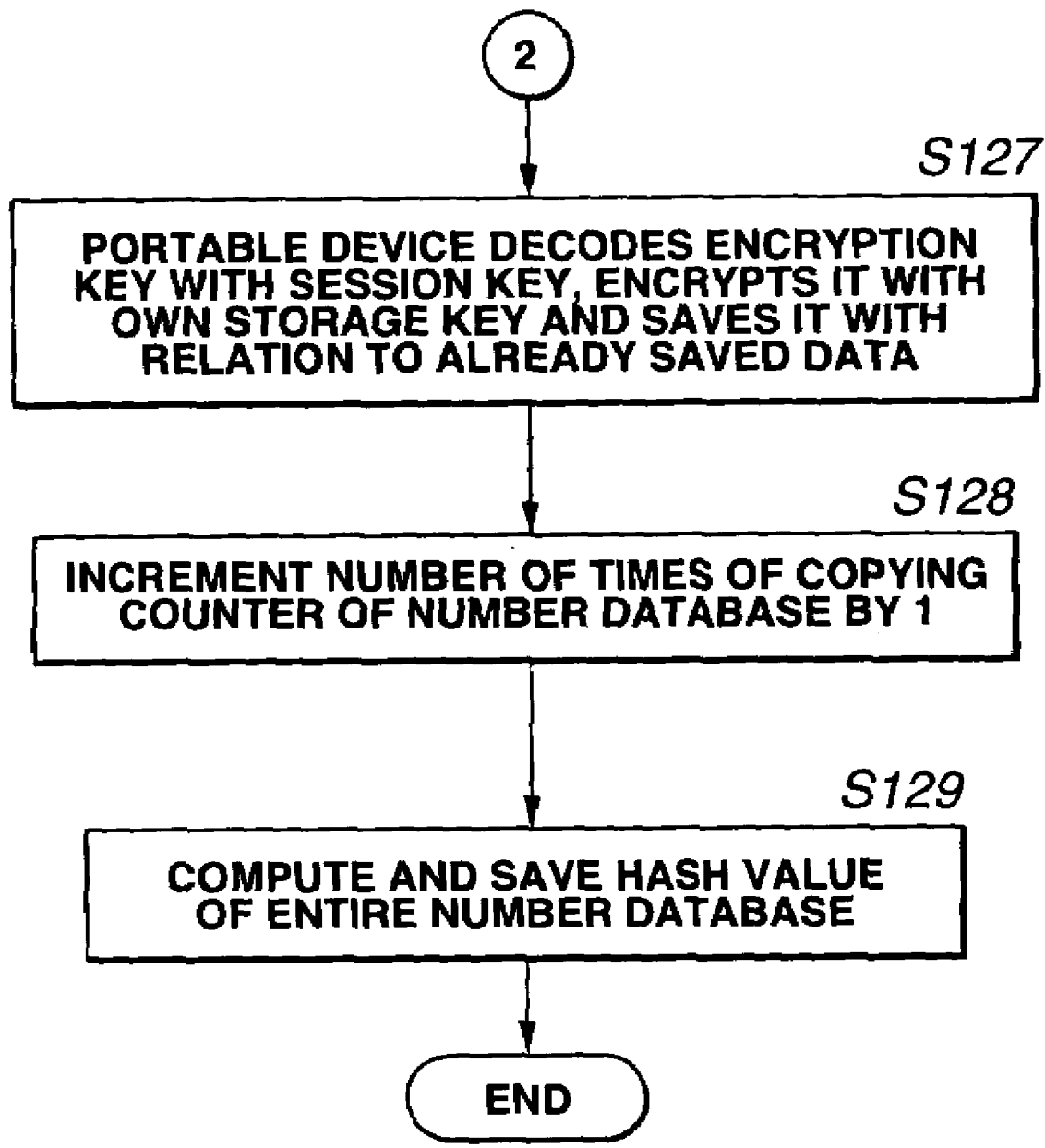

Referring to the flowchart of FIGS. 16A to 16C, the processing of copying music data from the HDD 21 to the portable device 6, by the CPU 11 executing the contents management program 111 and by the CPU 53 executing the main program, is explained. The processing from step S111 to step S127 of FIGS. 16A to 16C is similar to the processing of step S51 to step S67 of moving music data from the HDD 21 to the portable device 6 of FIGS. 12A to 12C. That is, in this case, the music number database is checked as to possible falsification, after which the reproduction condition of the selected music number is checked. The reciprocal authentication processing between the portable device 6 and the personal computer 1 then is carried out, after which musical data is transferred from the HDD 21 of the personal computer 1 to the flash memory 61 of the portable device 6 for storage therein. Then, at step S128, the CPU 11 of the personal computer 1 increments the number of times of copying counter of the music number database by 1. At step S129, the CPU 11 causes the hash values of the entire music number database to be calculated and stored in the non-volatile memory 34.

Figure 17:
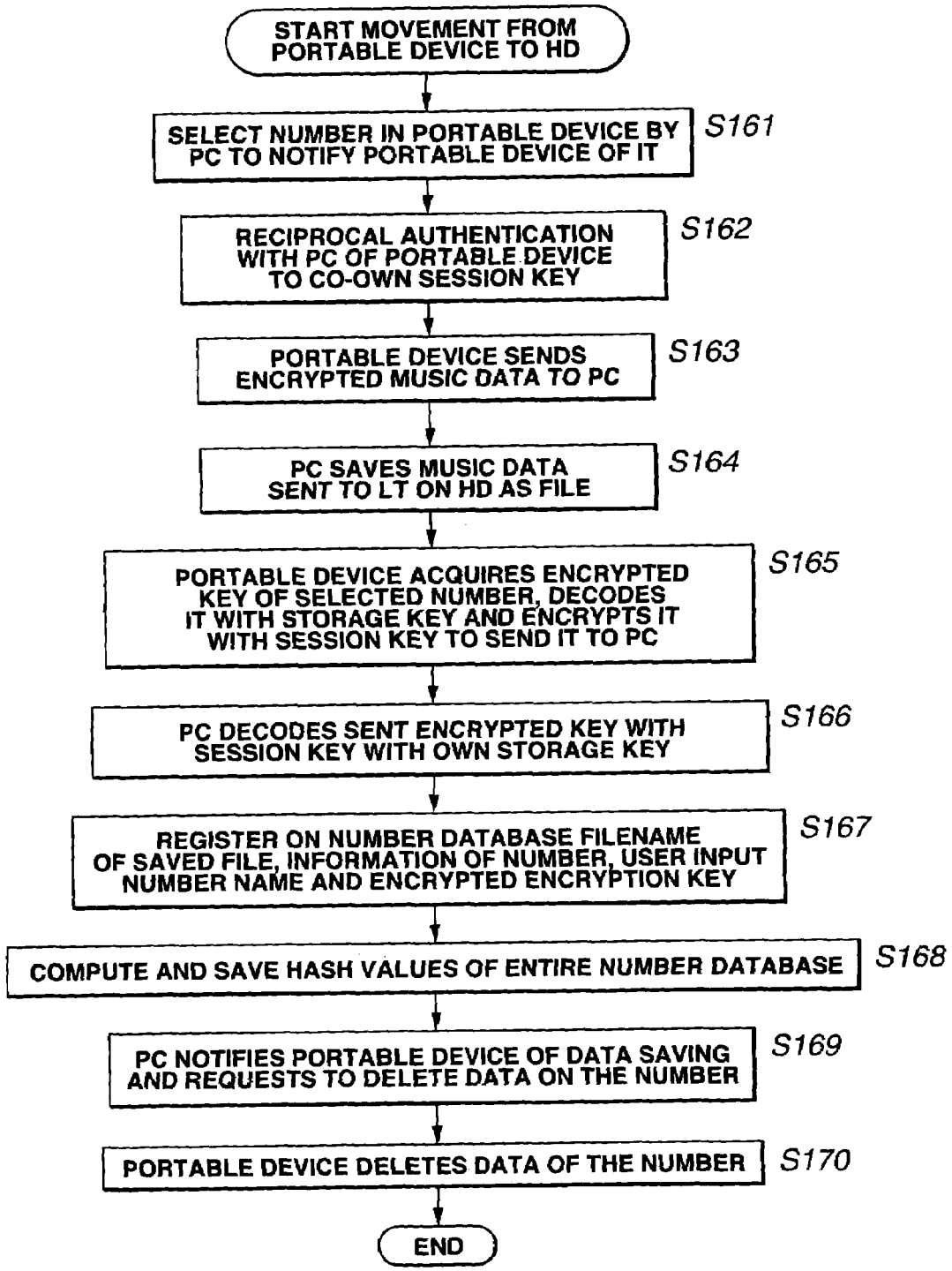
FIG. 17 is a flowchart for illustrating the operation of moving data from the portable device to the HDD.

Referring to the flowchart of FIG. 17, the processing of moving music data from the portable device 6 to the HDD 21 is explained. At step S161, the CPU 11 of the personal computer 1 requests the CPU 53 of the portable device 6 to read out the information of the music number stored in the flash memory 61. The CPU 53 is responsive to this request to transmit the information on the music number stored in the flash memory 61 to the personal computer 1. Based on this information, the CPU 11 causes the display 20 to demonstrate the GUI for selecting the music number stored in the flash memory 61. The user actuates the keyboard 18 or the mouse 19 to specify the music number to be moved from the portable device 6 to the HDD 21, based on the GUI.

At step S162, the CPU 11 executes the reciprocal authentication processing with respect to the CPU 53 to co-own the session key. This processing is similar to that at step S56 of FIG. 12A.

Then, at step S163, the CPU 53 reads out the music data of the selected music number stored encrypted in the flash memory 61 to transfer the read-out data to the personal computer 1. At step S164, the CPU 11 of the personal computer 1 accords a filename as a file to music data transferred hereto from the portable device 6 to store the file in the HDD 21. This storage can be done by according the position information of the filename, such as, for example, the number of bytes as counted from the leading end, as a part of a file.

At step S165, the CPU 53 reads out the encrypted encryption key of the selected music number stored in the flash memory 61, decodes the key with its own storage key, encrypts the decoded key with the session key and transfers it to the personal computer 1. This encryption key has been stored in the flash memory 61 by the processing at step S67 of FIG. 12C.

If the encryption key from the portable device 6 is transferred from the portable device 6, the CPU 11 of the personal computer 1 decodes the key with the session key and encrypts it with its own storage key. At step S167, the CPU 11 registers the filename of the music data file stored at step S164, the name of the music data inputted via GUI by the user or the encryption key encrypted at step S166 etc on the music number database of the HDD 21. At step S168, the CPU 11 causes the CPU 32 to compute the hash values of the entire database to store the computed hash values in the non-volatile memory 34.

At step S169, the CPU 11 of the personal computer 1 advises the portable device 6 of the effect that the encryption key has now been stored to make a request for deleting the music data of the music number. If the musical data of the music number is requested by the personal computer 1, the CPU 53 at step S170 deletes the musical data of the music number stored in the flash memory 61.

Figure 18:
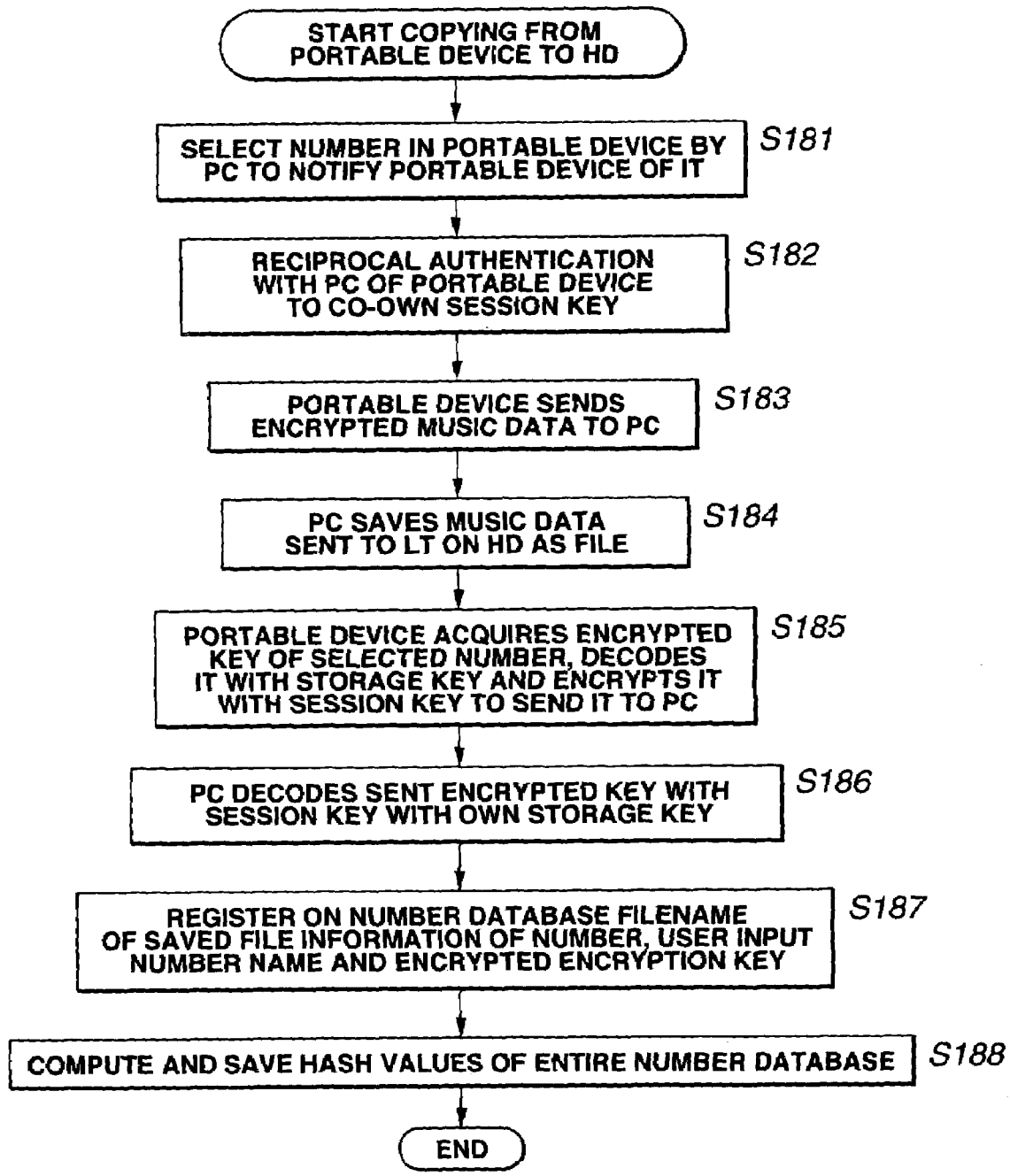
FIG. 18 is a flowchart for illustrating the operation of copying data from the portable device 6 to the HDD.

The processing for copying the musical data from the portable device 6 to the HDD 21, by the CPU 11 executing the contents management program 111 and by the CPU 53 executing the main program, is explained with reference to the flowchart of FIG. 18. The processing of steps S181 to S188 shown in FIG. 18 is similar to the processing of steps S161 to S168 in the processing of moving musical data from the portable device 6 of FIG. 17 to the HDD 21. That is, the copying processing is basically the same as that for moving except that the steps S169, S170 in FIG. 17 are omitted. Therefore, the corresponding description is omitted for clarity.

Figure 19:
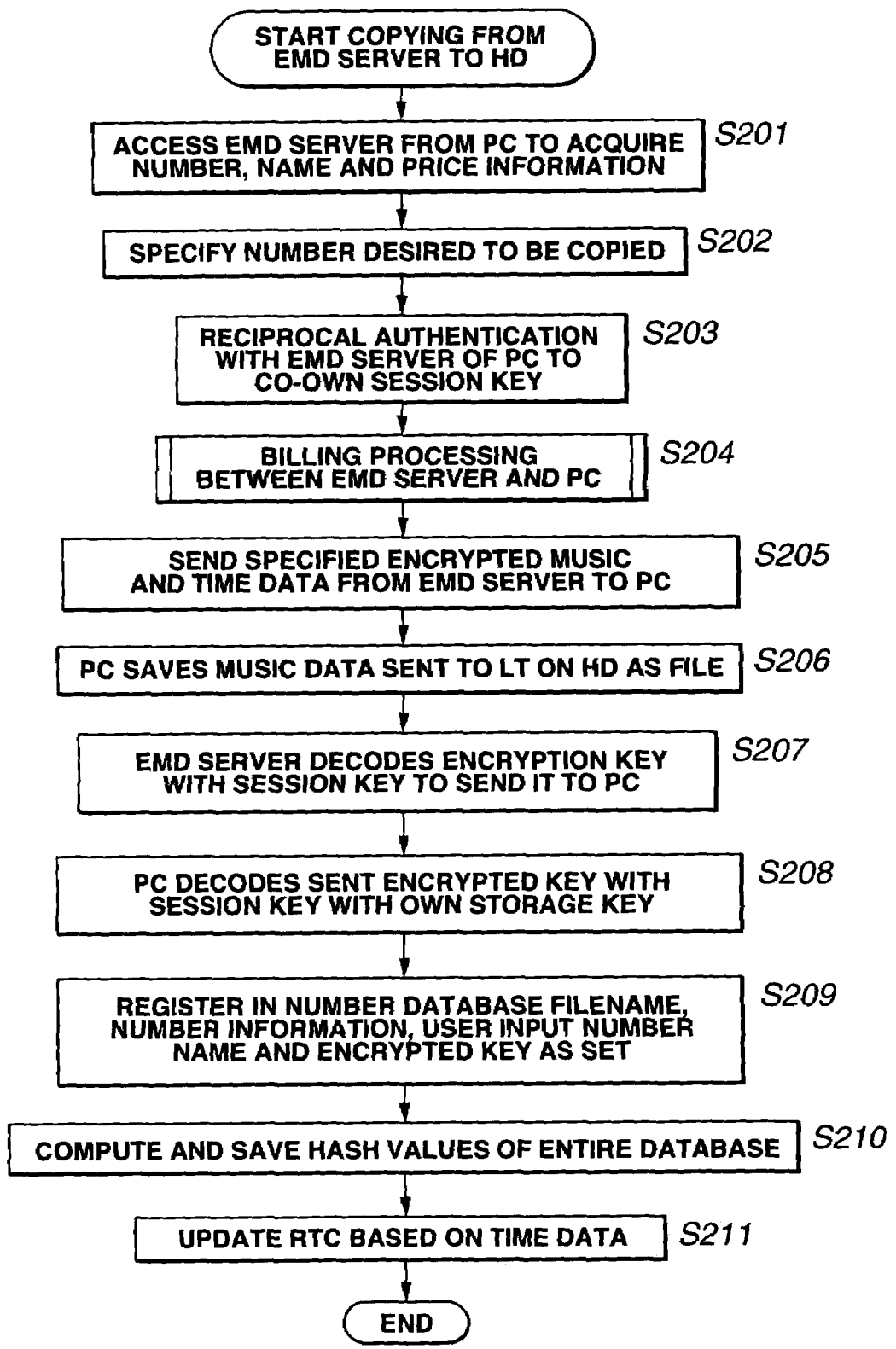
FIG. 19 is a flowchart for illustrating the processing of copying data from an EMD registration server to the HDD.

Referring to the flowchart of FIG. 19, the processing of copying the musical data transferred from the EMD server 4 on the HDD 21 by the EMD server 4 and the CPU 11 executing the contents management program 111, is explained. If accessing to the EMD server 4 is commanded by the user via the keyboard 18 or the mouse 19, the CPU 11 at step S201 controls the communication unit 25 to permit accessing to the EMD server 4 via the network 2. The EMD server 4 is responsive to this accessing to transfer the information held by it, such as the number or title of the music number or the variable information, to the personal computer 1. On acquisition of the information via the communication unit 25, the CPU 11 of the personal computer 1 demonstrates the information on the display 20 via the interface 17. The user exploits the GUI demonstrated on the display 20 to specify the music number desired to be copied. This specifying information is transferred via the network 3 to the EMD server 4. At step S203, the CPU 11 executes the reciprocal authentication processing with the EMD server 4 via the network 2 to co-own the session key.

The reciprocal authentication processing between the personal computer 1 and the EMD server 4 may be carried out using a public key and a secret key prescribed in ISO 9798-3, as an example. In this case, the personal computer 1 owns its own secret key and the public key of the EMD server 4 from the outset, whilst the EMD server 4 has its own secret key, to enable the reciprocal authentication processing to be executed. The public key of the personal computer 1 may be transferred from the EMD server 5, or the certificate previously distributed to the personal computer 1 may be transferred from the personal computer 1 to the EMD server 4. In the latter case, the certificate may be certified by the EMD server 4 to produce the public key. Also, the CPU 11 at step S204 executes the billing processing with respect to the EMD server 4. The billing processing will be explained subsequently by referring to the flowchart of FIG. 20.

Then, at step S205, the EMD server 4 transfers the encrypted music data of the music number specified at step S202 to the personal computer 1 via the network 2. At this time, the time information is also transmitted as necessary. At step S206, the CPU 11 accords the filename to the music data transferred thereto to store the data as a file. At step S207, the EMD server 4 encrypts the encryption key of the music number, using the session key co-owned with the personal computer 1 at step S203, to transfer the encrypted encryption key to the personal computer 1.

At step S208, the CPU 11 decodes the encryption key, transferred from the EMD server 4, by itself or in cooperation with the CPU 32 of the adapter 26, to encrypt the decoded encryption key with its own storage key. At step S209, the CPU 11 groups together the filename of the music number, information on the music number, the information on the input name of the music number, and the encrypted encryption key, as a set, and registers the set in the music number database of the HDD 21. At step S210, the CPU 11 causes the hash value of the entire music number database to be computed for storage in the non-volatile memory 34.

At step S205, the EMD server 4 transmits time data, along with the music data, to the personal computer 1. This time data is transferred from the personal computer 11 to the adapter 26. On reception of the time data, transmitted from the personal computer 1, the CPU 32 of the adapter 26 at step S211 corrects the time of the RTC 35. Since the time information of the RTC 35 of the adapter 26 is corrected in this manner on the basis of the time information obtained from an external equipment recognized to be correct as a result of the reciprocal authentication, correct time information can be kept at all times in the adapter 26.

Figure 20:
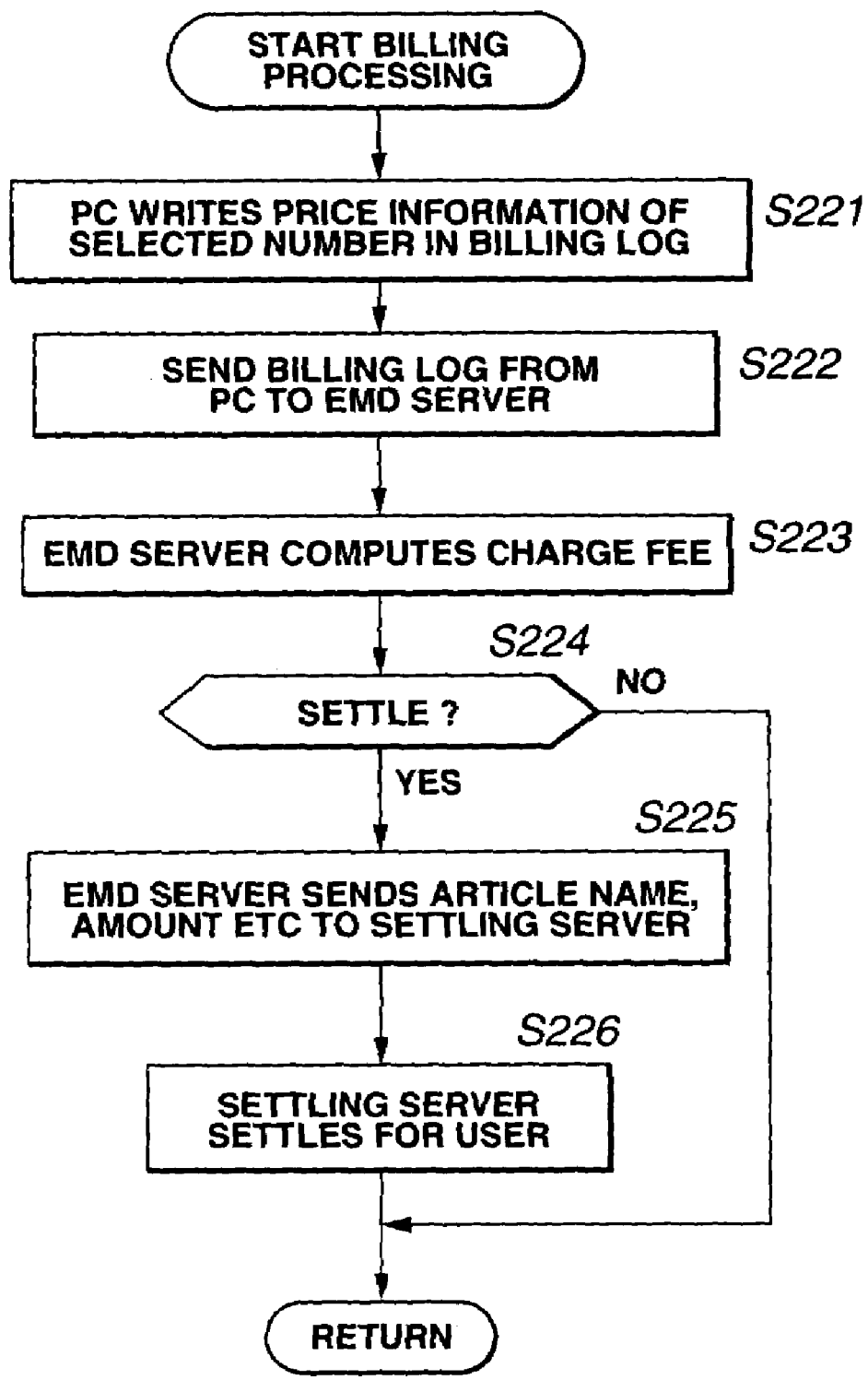
FIG. 20 is a flowchart for illustrating details of the operation of processing for billing at step S204 in the flowchart of FIG. 19.

Referring to the flowchart of FIG. 20, the processing pertinent to the billing at step S204 of FIG. 19, by the EMD server 4 and the CPU 11 executing the contents management program 111, is explained in detail. At step S221, the personal computer 1 reads out the price information of the selected music number, specified at step S201, to write the read-out information on a billing log on the HDD 21. FIG. 21 shows an example of such billing log. In this case, the user copies items 1 to 3 from the EMD server 4, with the charges for the items 1 and 2 being 50 yen and with that of the item 3 being 60 yen. The hash value of the charging log at this time point is also computed by the CPU 32 and registered in the non-volatile memory 34.

Then, at step S222, the CPU 11 of the personal computer 1 reads out the billing log written at step S221 from the HDD 21 to transfer the read-out charging log via the Network 2 to the EMD server 4. The EMD server 4 at step S223 executes the billing computational processing based on the billing log transferred from the personal computer 1. That is, the EMD server 4 adds the billing log transferred by the user of the personal computer 1 to the enclosed database for updating. At step S224, the EMD server 4 decides whether or not the billing log should be settled at once. If it is decided that the settlement be carried out at once, the program moves to step S225 where the EMD server 4 transfers the name of an article necessary for settlement or amount to an arbitration server, not shown. At step S226, the arbitration server executes the arbitration processing for the user of the personal computer 1. If it is decided at step S224 that the settlement not be carried out at once, the processing at steps S225 and S226 is skipped. That is, this processing is subsequently executed periodically, such as once a month.

Figure 22A:
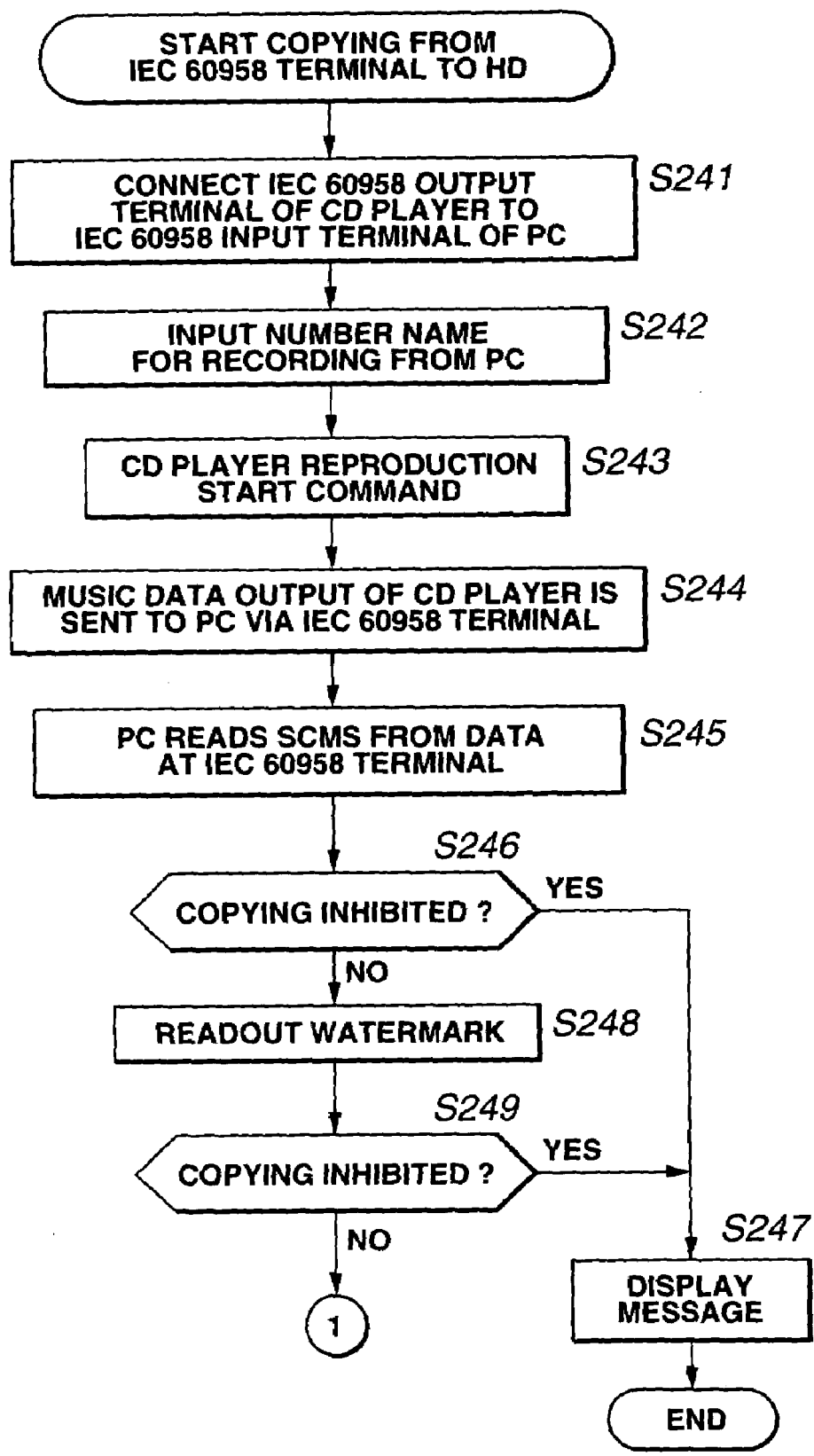
FIGS. 22A and 22B are flowcharts for illustrating the operation of copying data from the IEC60958 terminal of the personal computer to the hard disc 15.
Figure 22B:
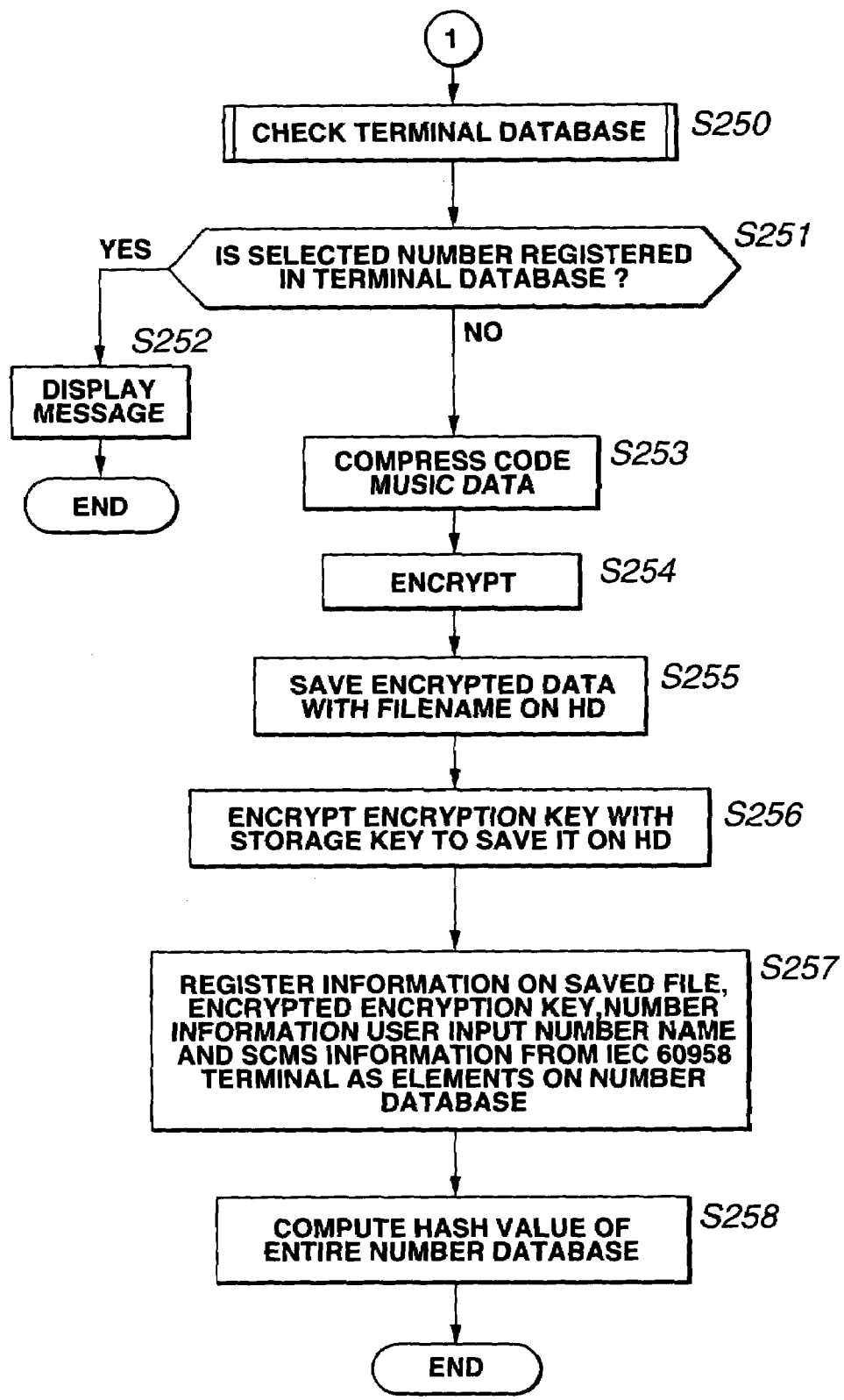

Referring to the flowchart of FIGS. 22A and 22B, the processing of copying the playback music data from a CD player, supplied from an IEC 60958 terminal of the audio input/output interface 24, not shown, to the HDD 21, by the CPU 11 executing the contents management program 111, is explained. At step S241, the user connects the IEC60958 of the CD player to the IEC 60958 terminal of the audio input/output interface 24 of the personal computer 1. At step S242, the user acts on the keyboard 18 or the mouse 19 to enter the title of the music number to be copied from the CD player or the number corresponding to the musical number. At step S243, the user actuates a button of the CD player ro start the reproduction of the CD player. If the CD player and the personal computer 1 are interconnected by a line for exchanging control signals, a playback start command is inputted via the keyboard 18 or the mouse 19 of the personal computer 1 to start the reproduction of the CD player.

At step S244, if the reproduction of a CD is started in the CD player, the music data outputted by the CD player is transferred via IEC 60958 terminal 16a to the personal computer 1. At step S245, the CPU 11 reads out SCMS (Serial Copy Management System) data from input data at the IEC 60958 terminal 16a. In this SCMS data, there are contained the information on copying inhibition, copying allowed only once or copying free. The CPU 11 at step S246 checks whether or not the SCMS data represents copying inhibition. If the result indicates copying inhibition, the program moves to step S247 where the CPU 11 causes the display 20 to demonstrate a message reading: "copying is inhibited" to terminate the processing for copying. That is, in such case, the copying on the HDD 21 is inhibited.

If the CPU 11 verifies at step S246 that the SCMS information read out at step S245 is not indicating copying inhibition, it advances to step S248 to read out the watermark code to check at step S249 whether or not the watermark code indicates the copying inhibition. If the watermark code indicates copying inhibition, the program moves to step S247 where a pre-set message is displayed as above to terminate the copying processing.

If it is verified at step S249 that the watermark code is not indicating copying inhibition, the program moves to step S250 to carry out terminal database check. If, as a result of the terminal database check, the selected music number has already been registered, the processing is terminated by the steps S251 and S252. This processing is similar to that of steps S13 and S14 of FIG. 7.

If the selected music number has not been registered on the HDD 21, the registration processing is executed at steps S253 to S258. Since the processing of steps S253 to S258 is similar to that from steps S19 to S24 of FIG. 7, except that the SCMS information supplied from the IEC60958 terminal at step S257 is also registered in the music number database, the processing is not explained herein specifically.

Figure 23A:
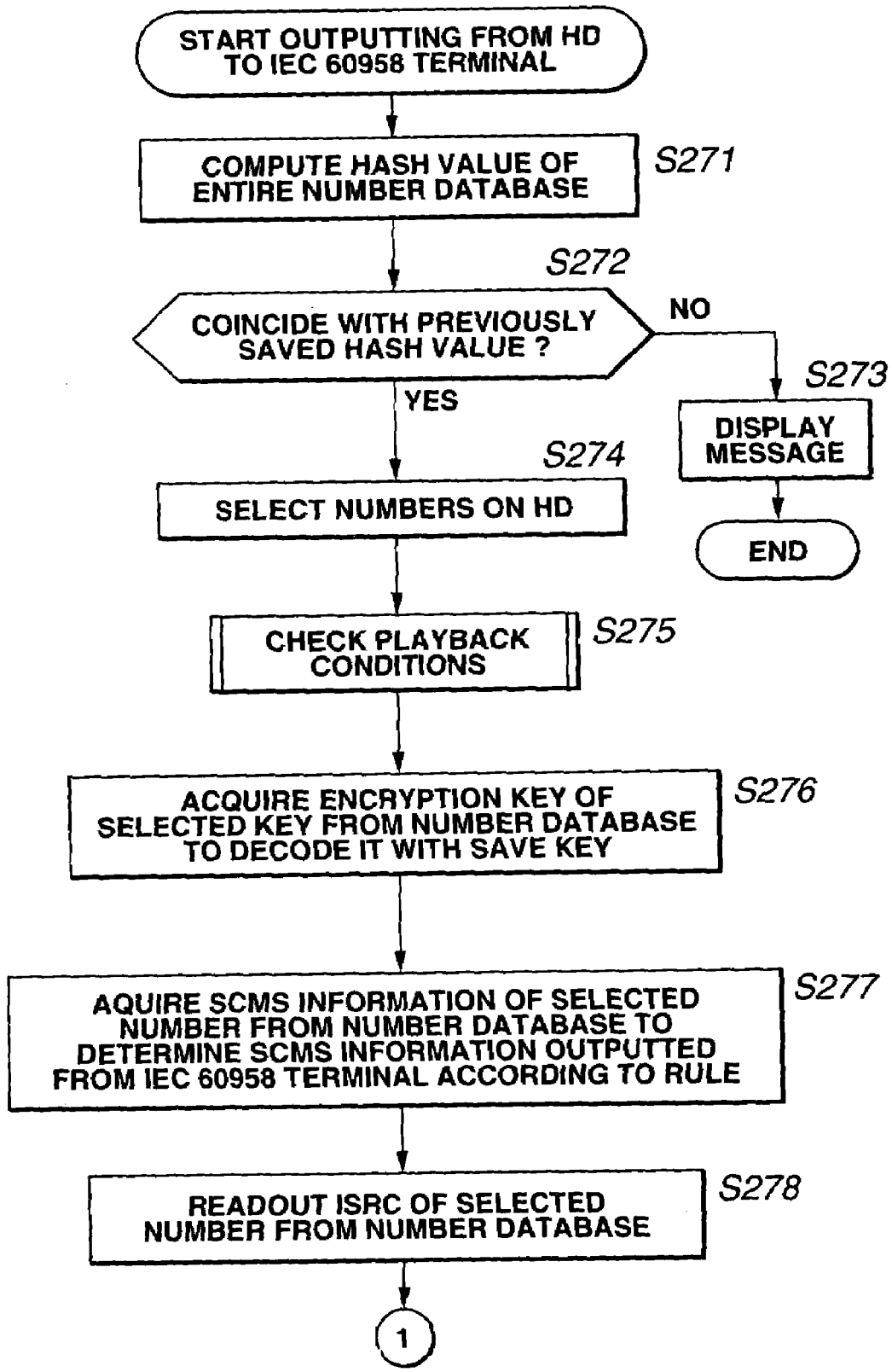
FIGS. 23A and 23B are flowcharts for illustrating the operation of outputting data from the HDD to the IEC60958 terminal.
Figure 23B:
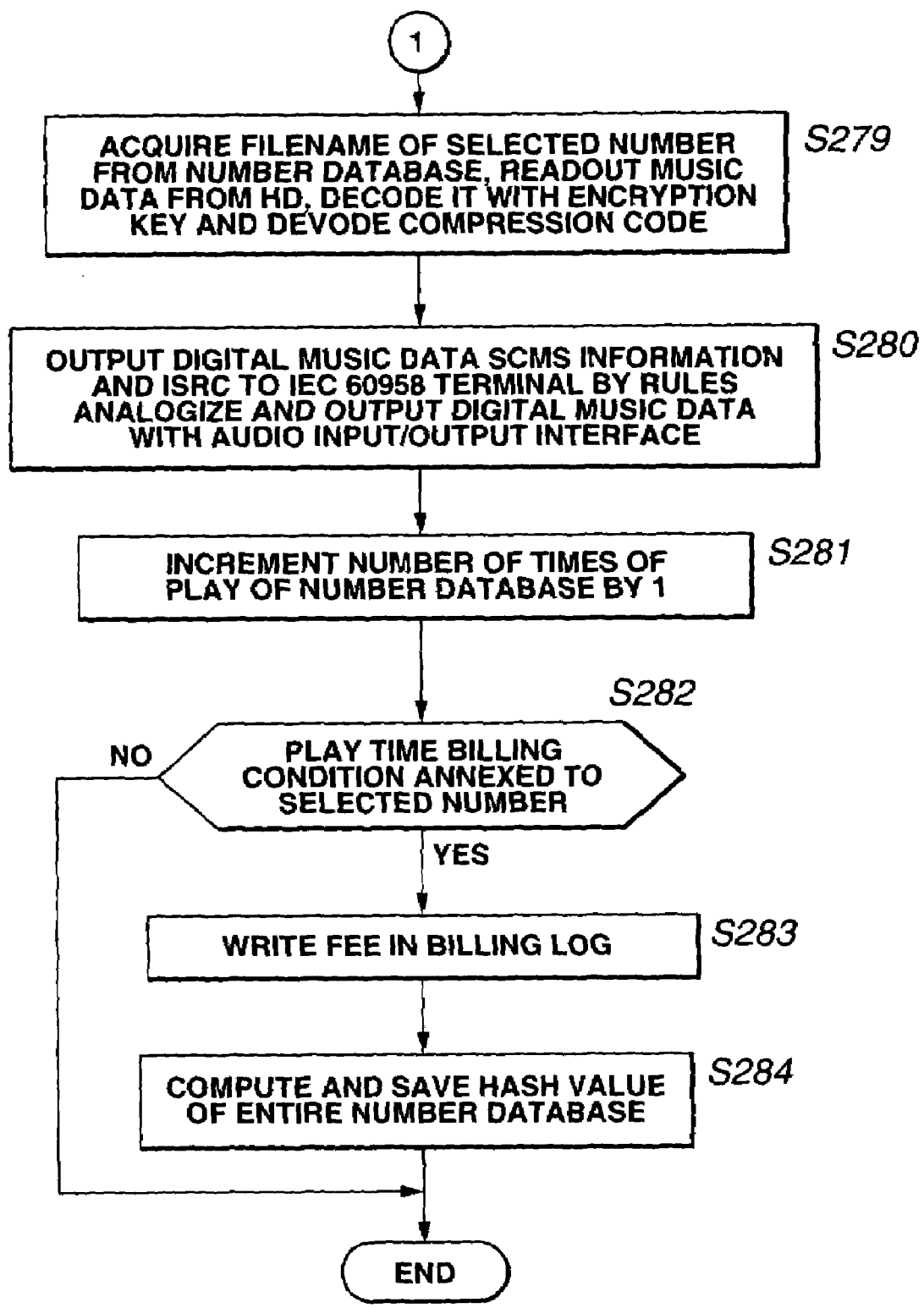

Referring to the flowchart of FIGS. 23A and 23B, the processing of reproducing music data from the HDD 21 to the IEC 60958 terminal, by the CPU 11 executing the contents management program 111, is explained. At steps S271 to S273, as at steps S111 to S113 of FIG. 16A, the hash values of the entire music number database are computed to verify whether or not these hash values coincide with those stored last time, by way of performing the check as to whether or not the music number database has been altered with malignant intention. If it is verified that the music number database has not been altered, the program moves to step S274 where the CPU 11 accesses the music number database of the HDD 21 to read out the information of the music number registered therein to demonstrate the read-out information on the display 20. The user, viewing the display, acts on the keyboard 18 or the mouse 19 to select the music number to be reproduced. At step S275, the CPU 11 executes the check of the playback condition etc of the selected music number. The processing for checking the playback condition etc will be explained in detail by referring to the flowchart of FIG. 24.

Then, at step S276, the CPU 11 reads out the encryption key of the music number selected at step S274 to decode the read-out encryption key with the storage key. At step S277, the CPU 11 reads out the SCMS information of the selected music number from the music number database to decide the SCMS information outputted at the IEC60958 terminal in accordance with the rule of the SCMS system. For example, if limitations are placed on the number of times of reproduction, the number of times of reproduction is incremented by 1 to provide the new SCMS information. At step S278, the CPU 11 further reads out the ISRC of the selected music number from the music number database.

Then, at step S279, the CPU 11 reads out the filename of the selected music number from the music number database to read out the music data from the HDD 21 based on the read-out filename. The CPU 11 further reads out the encryption key corresponding to the music data from the music number database to decode the read-out key with a storage key. The CPU 11 then decodes the encrypted music data, using the decoded encryption key. The CPU 11 at step S280 outputs the digital music data, decoded at step S279 along with the SCMS information decided at step S277 and the IRSC information read out at step S278, at the IEC 60958 terminal 16a, in accordance with the prescriptions of IEC 60958. The CPU 11 also analogizes the digital music data to output the analog music data at an analog output terminal of the audio input/output interface 24.

At step S281, the CPU 11 increments the value of the number of times of playback counter in the music number database by 1. At step S282, it is checked whether or not the playback time charging condition has been added in the selected music number. If the playback time charging condition has been added, the program moves to step S283, where the CPU 11 writes the corresponding fee in the billing log. At step S284, the CPU 11 causes the CPU 32 to compute the hash values of the entire music number database for storage in the non-volatile memory 34. If it has been verified at step S282 that the playback time billing condition has not been added to the selected music number, the processing at steps S283 and S284 is skipped.

Figure 24:
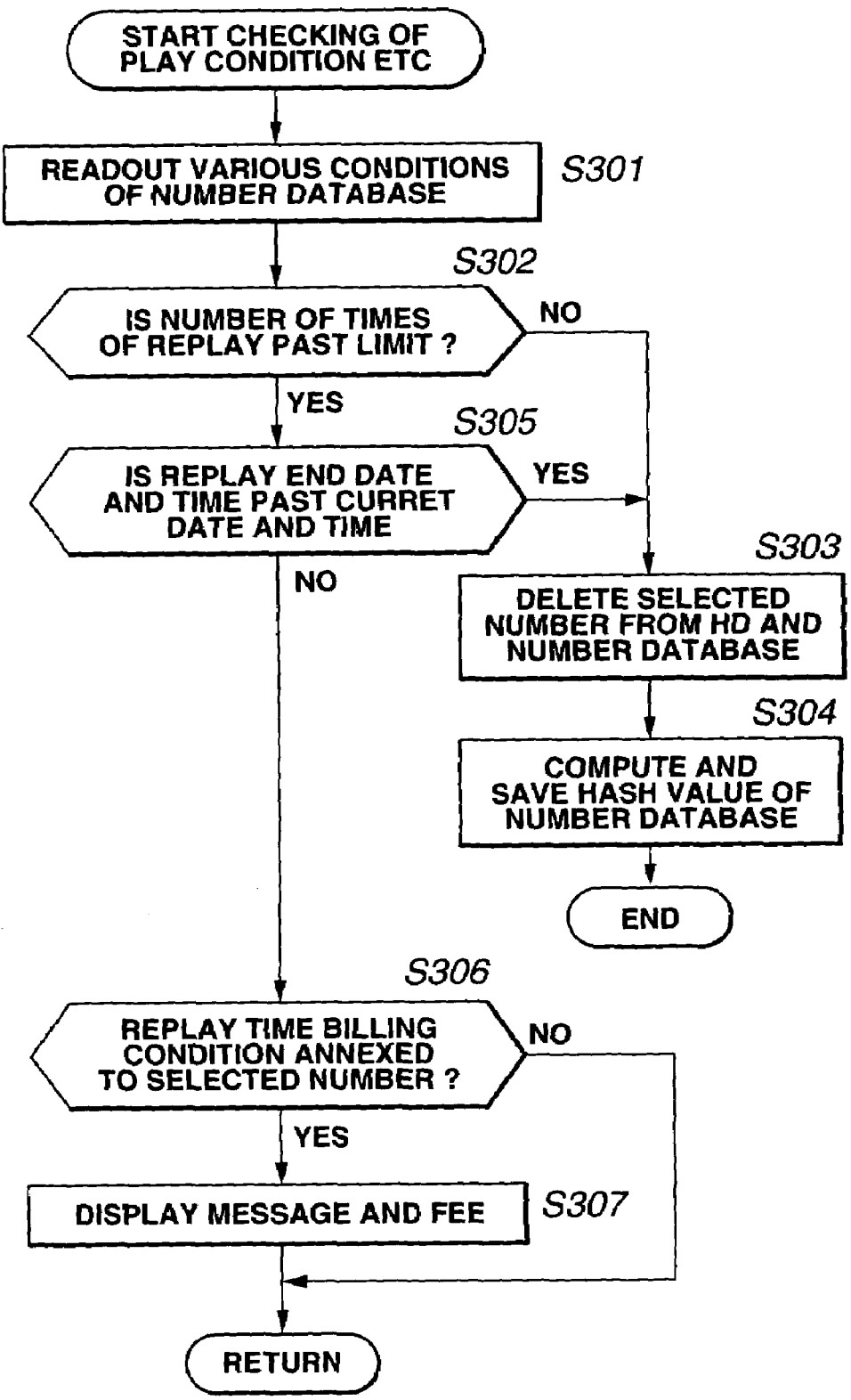
FIG. 24 is a flowchart for illustrating the operation of checking e.g., the reproduction condition at step S275 in the flowchart of FIG. 23A.

Referring to the flowchart of FIG. 24, the processing of checking the playback conditions etc of the step S275 of FIG. 23 is explained. At step S301, the CPU 11 reads out the variable conditions of the music number database. At step S302, the CPU 11 checks whether or not the number of times of reproduction has surpassed the limit number of times. If the result of check is YES, the program moves to step S303 where the selected music number is deleted from the HDD 21, at the same time as the information on the selected music number is deleted from the music number database. At step S304, the CPU 11 causes the CPU 32 to compute the new hash value of the music number database to store the computed hash value in the non-volatile memory 34. In this case, the playback output is inhibited.

If, at step S302, the number of times of playback is verified to be less than the limit value, the program moves to step S305, where the CPU 11 verifies whether or not the date and time of playback end is past the current date and time. If at step S303, the date and time of playback end is past the current date and time, the selected music number is deleted from the hard HDD21, whilst the corresponding information is deleted from the music number database. At step S304, the hash values of the new music number database are computed and stored. In this case, the playback output is inhibited.

If it has been verified at step S305 that the date and time of playback end is not past the current date and time, the program moves to step S306, where the CPU 32 verifies whether or not the playback time billing condition has been added to the selected music number. If the playback time billing condition has been added to the selected music number, the program moves to step S307, where the CPU 11 causes the message to the effect that the playback time billing condition has been added and the fee to be demonstrated on the display 20. If it has been verified that the playback time billing condition has not been added to the selected music number at step S306, the processing at step S307 is skipped.

Figure 25A:
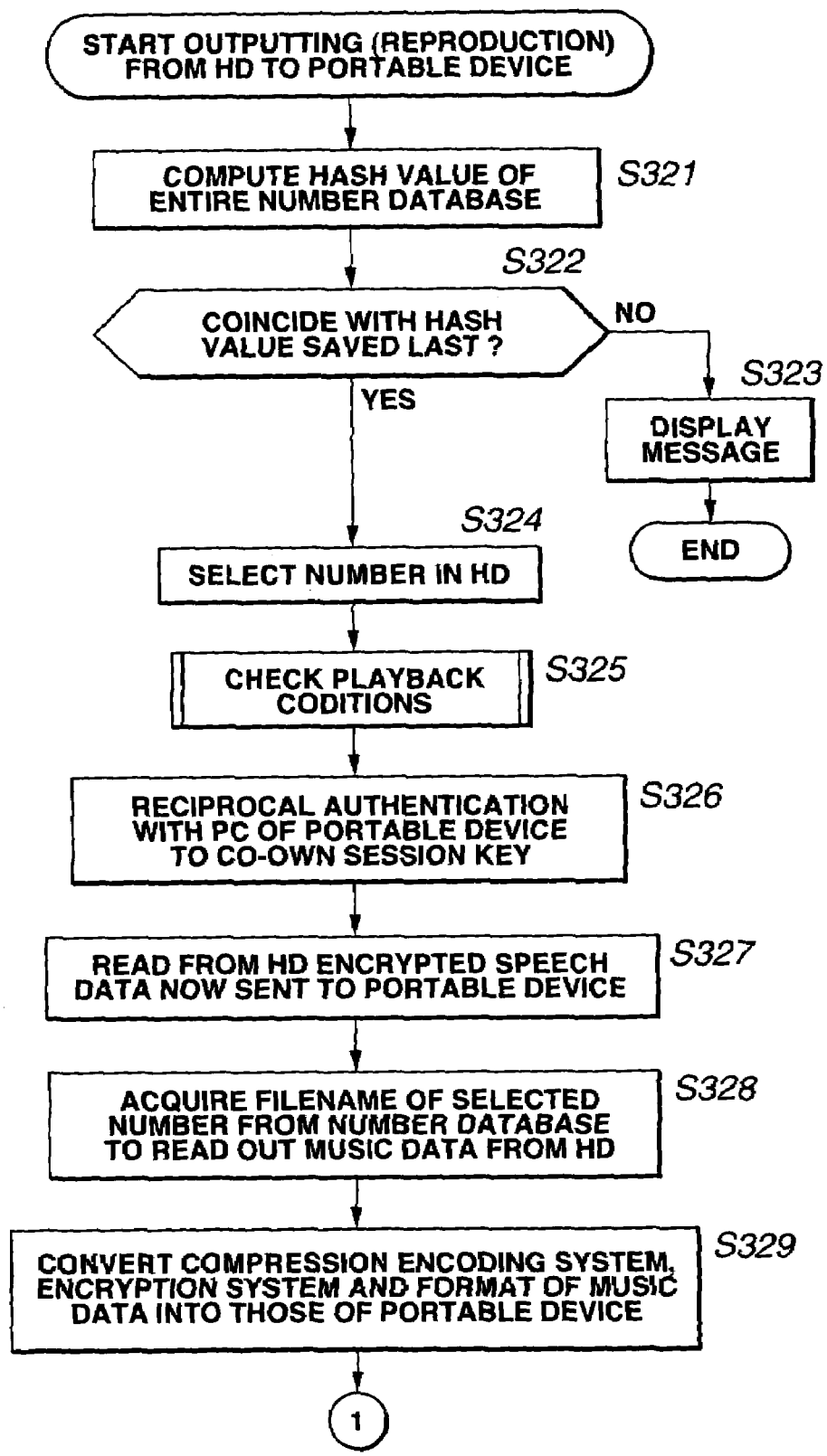
FIGS. 25A and 25B are flowcharts for illustrating the processing for outputting data from the HDD through the portable device.
Figure 25B:
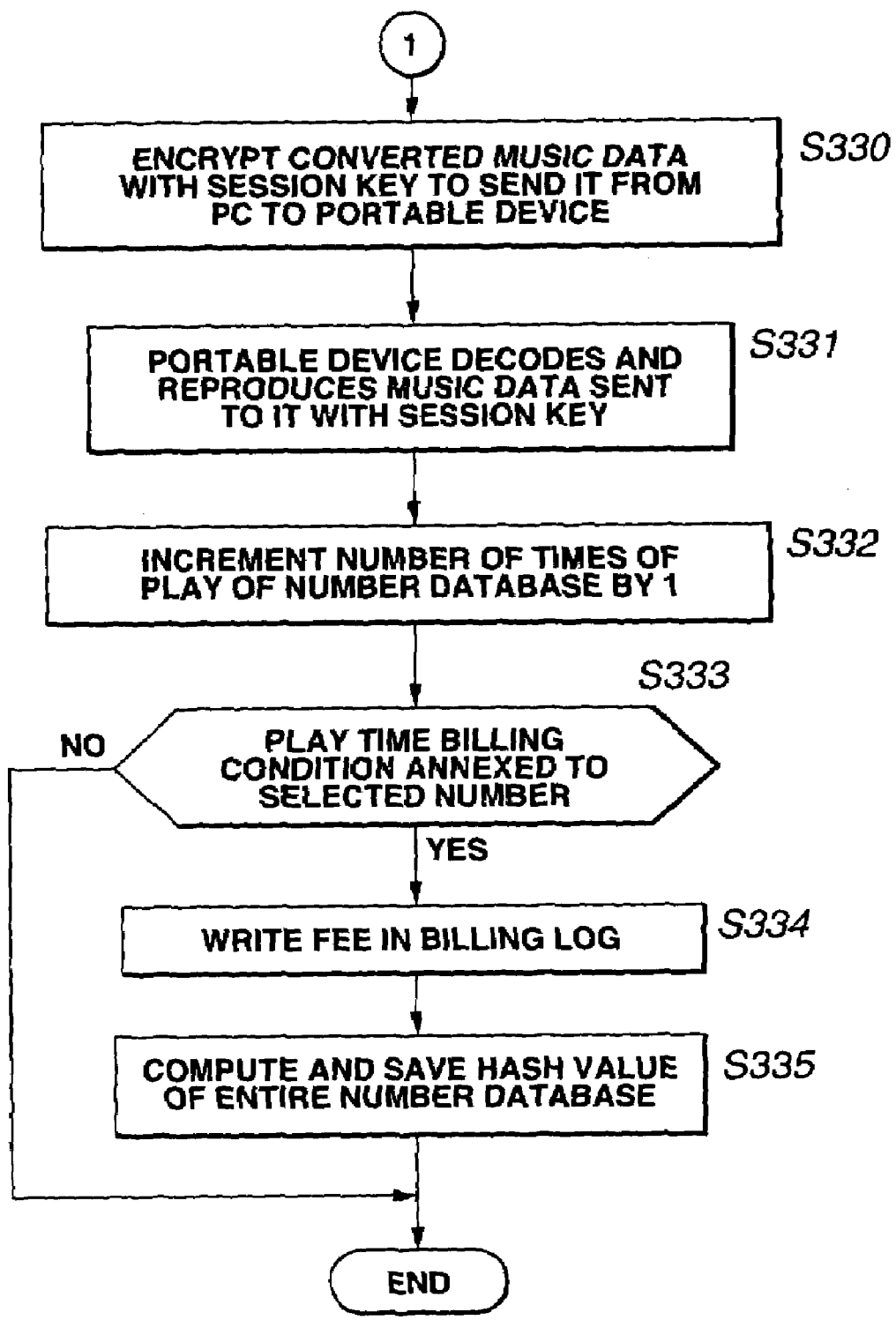

Referring to the flowchart of FIGS. 25A and 25B, the processing of outputting, that is reproducing, the music data from the HDD 21 via the portable device 6, by the CPU 11 executing the contents management program 111 and by the CPU 53 executing the main program, is explained. At steps S321 to S325, the music number database is checked as to possible alteration of the music number database, designation of the selected musical number and the playback condition of the selected music number, whilst the selected music number is specified. This processing is not explained specifically since it is similar to that of steps S271 to S275 of FIG. 23A.

At step S326, reciprocal authentication processing is executed between the portable device 6 and the personal computer 1 so that a session key is co-owned by the portable device 6 and the personal computer 1. At step S327, the CPU 11 of the personal computer 1 commands the portable device 6 to reproduce the encrypted audio data now sent thereto. At step S328, the CPU 11 reads out the filename of the selected music number specified at step S324 to read out the music data of the filename from the HDD 21. The CPU 11 at step S329 executes the processing of converting the encoding system, encryption system or the format of the music data into those of the portable device 6. At step S330, the CPU 11 encrypts the music data, converted at step S329, with the session key, to transfer the encrypted data to the portable device 6.

At step S331, the CPU 53 of the portable device 6 is responsive to the command transferred at step S327 from the personal computer 1 to decode the transferred data with the session key to reproduce and output the decoded data. At step S332, the CPU 11 increments the number of times of playback count of the music number database by one. At step S333, the CPU 11 verifies whether or not the playback time billing condition has been added to the selected music number. If the result of check is YES, the fee is written at step S334 in the billing log. At step S335, the CPU 11 causes the CPU 32 to newly compute and store the hash values of the entire music number database. If the result of check is NO, that is if the playback time billing condition has not been added to the selected music number, the processing at steps S334 and S335 is skipped.

According to the present invention, various elaborate techniques are used to prevent illicit duplication of the musical data. For example, the program for actuating the CPU 11 is a so-called tamer-resisting software in which the sequence of program execution is changed each time the program is executed.

Moreover, part of the function of the CPU 11 is performed by the adapter 26 as hardware, so that the various processing is executed by cooperation of the CPU and the adapter to improve operational safety.

Figure 8:
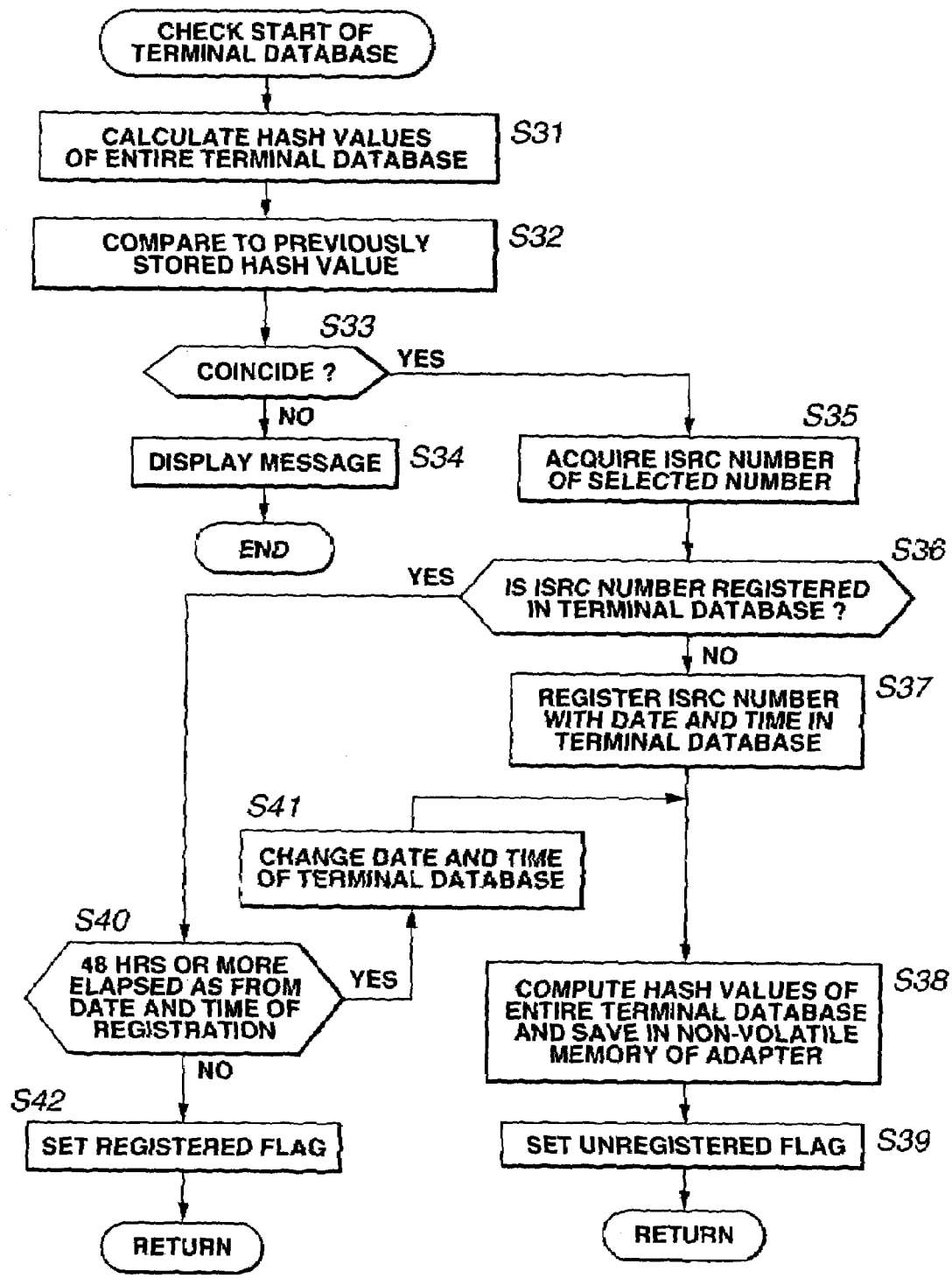
FIG. 8 shows a flowchart for illustrating the processing of checking a terminal database at step S12 in the flowchart of FIG. 7.

For example, the hash values of the music number database are not saved in the music number database itself, but are saved in the non-volatile memory 34 of the adapter 26. That is, past hash values to be referred to for comparison with the hash values saved last time, such as at steps S32 or S33 of FIG. 8, are saved in the non-volatile memory 34. Thus, it is possible to prevent copying or movement in which, before the musical data saved in the HDD 21 are copied on or moved to another recording medium, the recording contents of the HDD 21 are stored as backup data, and the latter data, kept as backup data in the HDD 21, is re-stored after copying or moving the music data saved in the HDD 21 to another recording medium.

Figure 26:
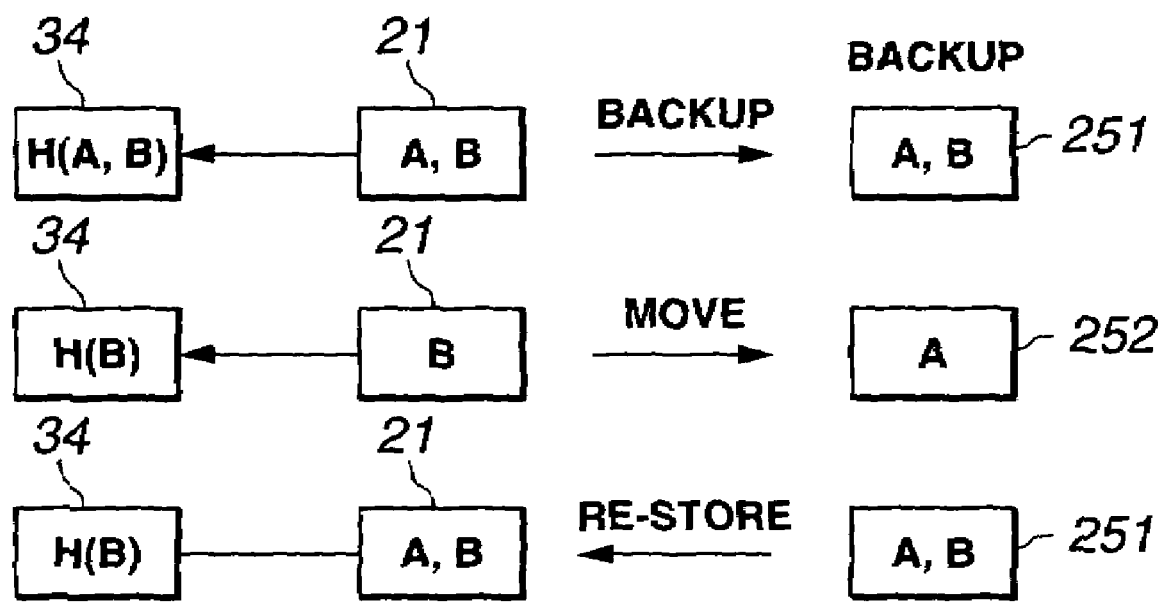
FIG. 26 illustrates the function of a non-volatile memory provided on an adapter of the personal computer.

If, for example, as shown in FIG. 26, the music numbers A and B are saved in the HDD 21, hash values corresponding to the information of the music numbers A and B are saved in the non-volatile memory 34. It is now assumed that, in this state, recording data on the HDD 21 have been saved as backup in another recording medium. If, of the music numbers A and B saved in the HDD 21, the music number A is moved to another recording medium 252, only the music number B is recorded on the HDD 21. Thus, the hash value in the non-volatile memory 34 is also changed to that corresponding to the music number B.

Thus, if the contents of the HDD 21 saved as backup on the recording medium 251 are re-stored on the HDD 21 so that the music numbers A and B are again saved on the HDD 21, the hash value computed from the information of the music number B is stored in the non-volatile memory 34, whilst the hash values computed from the music numbers A and B are not stored therein. Thus, at this time point, the hash value based on the music numbers A and B stored on the HDD 21 cease to be coincident with the past hash value stored in the non-volatile memory 34, thus indicating that the music number database has been altered. The result is that limitations are subsequently imposed on the use of the music numbers A and B saved on the HDD 21.

Also, the RTC 35 is enclosed in the adapter 26. The time information in this RTC 35 is corrected based on the time information transferred from another device, such as EMD server 4, for which the correct result of authentication has been obtained. The current date and time used is not that supervised by the personal computer 1. Rather, the current date and time used is that outputted by the RTC 35. Thus, it is not possible for the user to correct the current time of the personal computer 1 to a past time with malignant intention so as to evade the verification of the playback end time as the playback condition.

Figure 27:
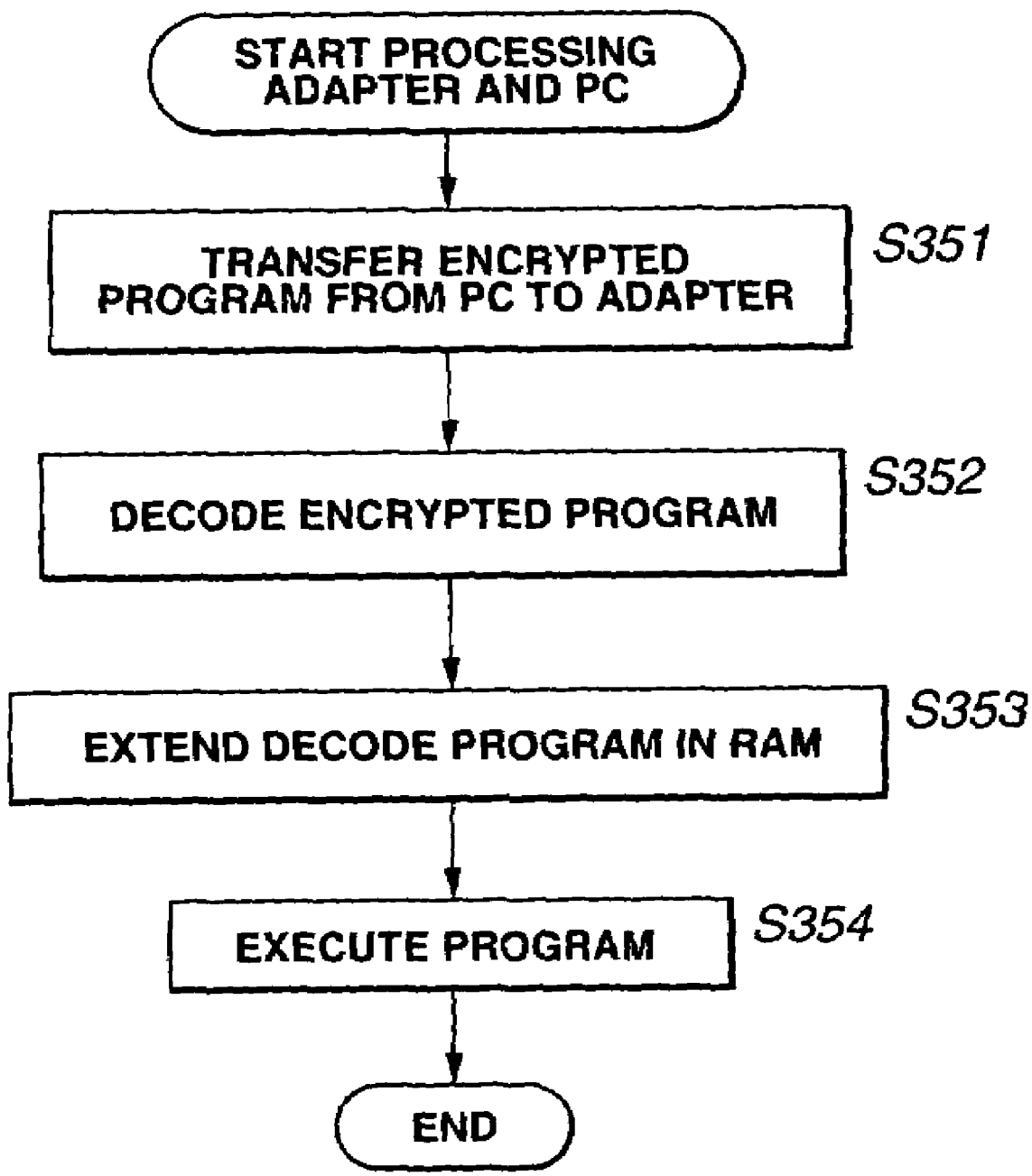
FIG. 27 is a flowchart for illustrating the adapter operation.

Also, the adapter 26 is configured for decoding the encrypted and transferred program in accordance with the program stored in the ROM 36 from the outset to execute the program to improve operational safety. This will be explained by referring to the flowchart of FIG. 27.

That is, if it is desired for the personal computer 1 to execute pre-set processing on the adapter 26, the personal computer 1 at step S351 encrypts the program to be executed by the adapter 26, using the encryption key pre-stored in the Ram 13, to transfer the encrypted program to the adapter 26. There is pre-stored in the ROM 36 of the adapter 36 the program for decoding and executing the encrypted program transferred from the personal computer 1. The CPU 32 at step S352 decodes the encrypted program, transferred from the personal computer 1, in accordance with the program stored in the ROM 36. The CPU 32 at step S313 expands the decoded program in the RAM 33. The CPU 32 at step S354 executes the expanded program.

When the CPU 11 of the personal computer 1 causes the adapter 26 to compute the hash value of the music number database of the HDD 21, the CPU 11 encrypts the data of the music number database with the encryption key to transfer the encrypted data to the CPU 32 of the adapter 26. The CPU 32 applies the hash function to the transferred data of the music number database to compute the hash value. The computed hash value is stored in the non-volatile memory 34. Alternatively, the hash value is compared to the past hash value previously stored and transmits the result of comparison to the CPU 11 of the personal computer 1.

Figure 28:
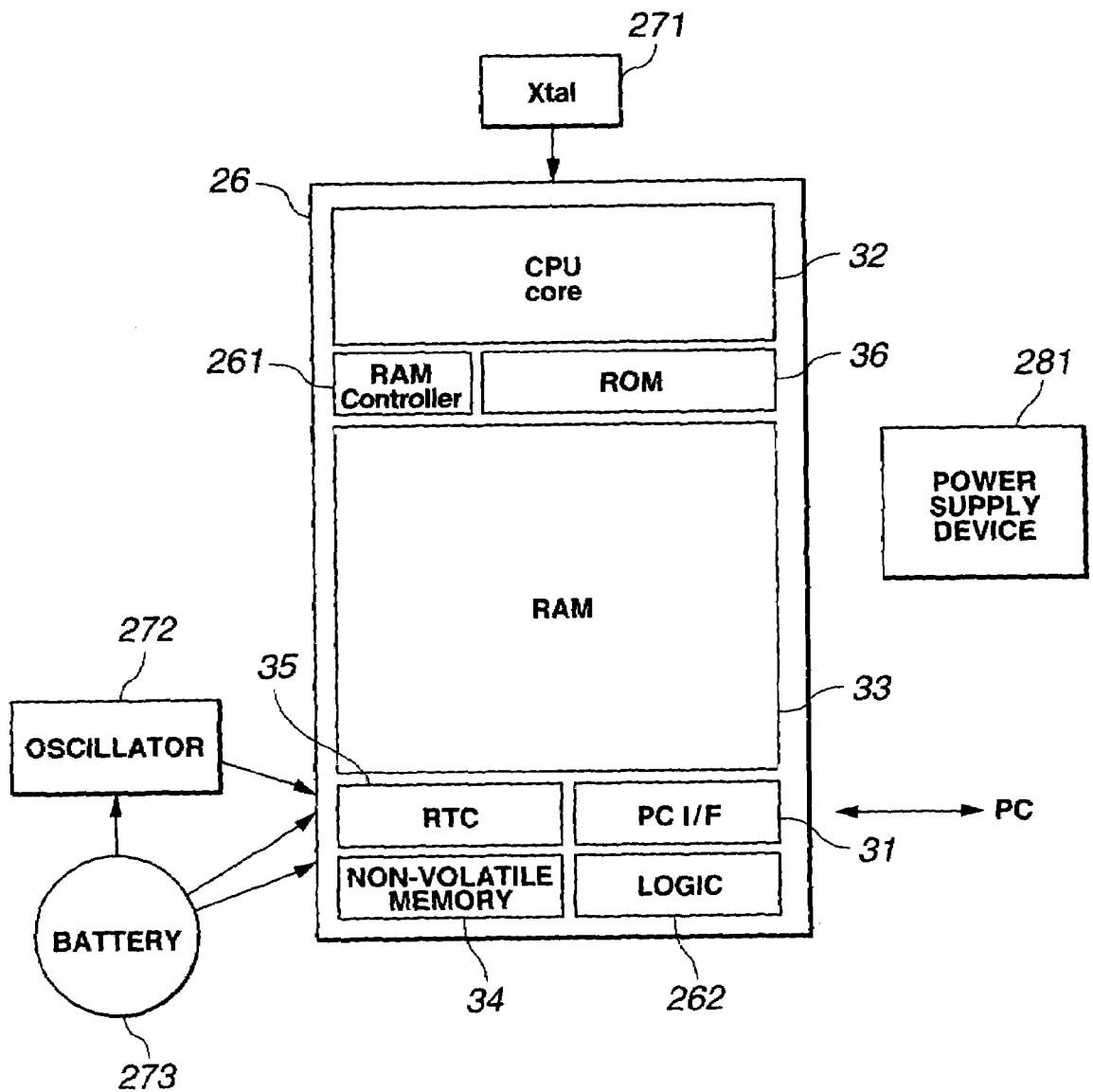
FIG. 28 illustrates the inside of the adapter.

FIG. 28 shows a more specified structure of the inside of the adapter 26. The adapter 26 includes a RAM controller 261 for controlling the writing and readout to or from the RAM 33 and a logic circuit 262, in addition to the interface 31, CPU 32, RAM 33, non-volatile memory 34, RTC 35 and the ROM 36 shown in FIG. 3. The logic circuit 262 is used for such processing in which encrypted music data is deciphered and the resulting deciphered data is directly outputted from the adapter 26.

The above components from the interface 31 to the ROM 36, RAM controller 261 and the logic circuit 262 are built into the inside of the semiconductor IC so as not to be dismounted from outside.

A quartz oscillator 271 is used for generating reference clocks in the execution the various processing by the adapter 26. An oscillation circuit 272 is an oscillation circuit for operating the RTC 35. The battery 273 feeds the backup power for the oscillation circuit 272, non-volatile memory 34 and the RTC 35. Other circuits of the adapter 26 are fed with the power from a power source supplying circuit 281 of the personal computer 1.

Figure 29A:
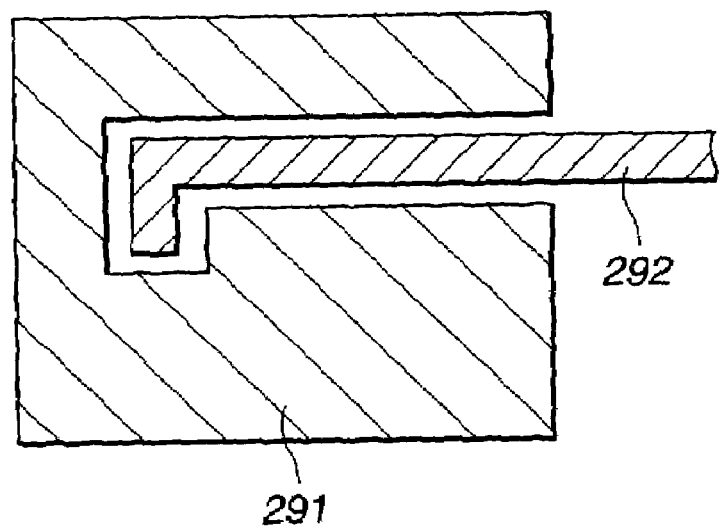
FIGS. 29A and 29B illustrate typical structure of the non-volatile memory.
Figure 29B:
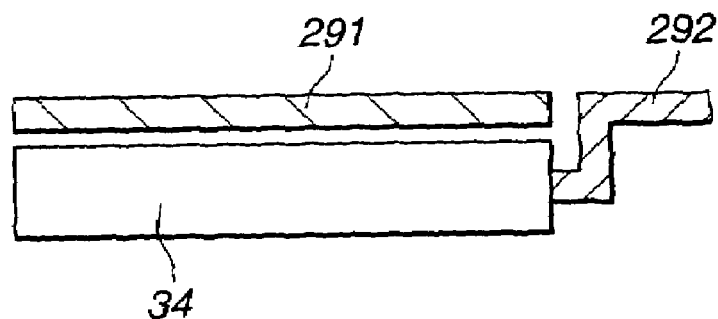

The non-volatile memory 34 can be constructed by a write-erase ROM. However, if the RAM is constructed by the RAM supported by the backup power source from the battery 273, it is possible to provide a protective aluminum layer 291 on the non-volatile memory 34 and to provide a power source pattern 292, supplying the power from the battery 273 to the non-volatile memory 34, so that the power source pattern 292 will be flush with the protective aluminum layer 291 as shown in FIGS. 29A and 29B. By so doing, if it is attempted to delete the protective aluminum layer 291, the power source pattern 292, lying on the same plane as that of the protective aluminum layer 291, is also deleted, so that the power supply to the non-volatile memory 34 is interrupted to erase the inner stored data. This structure improves tamper-resisting properties more significantly.

Figure 30:
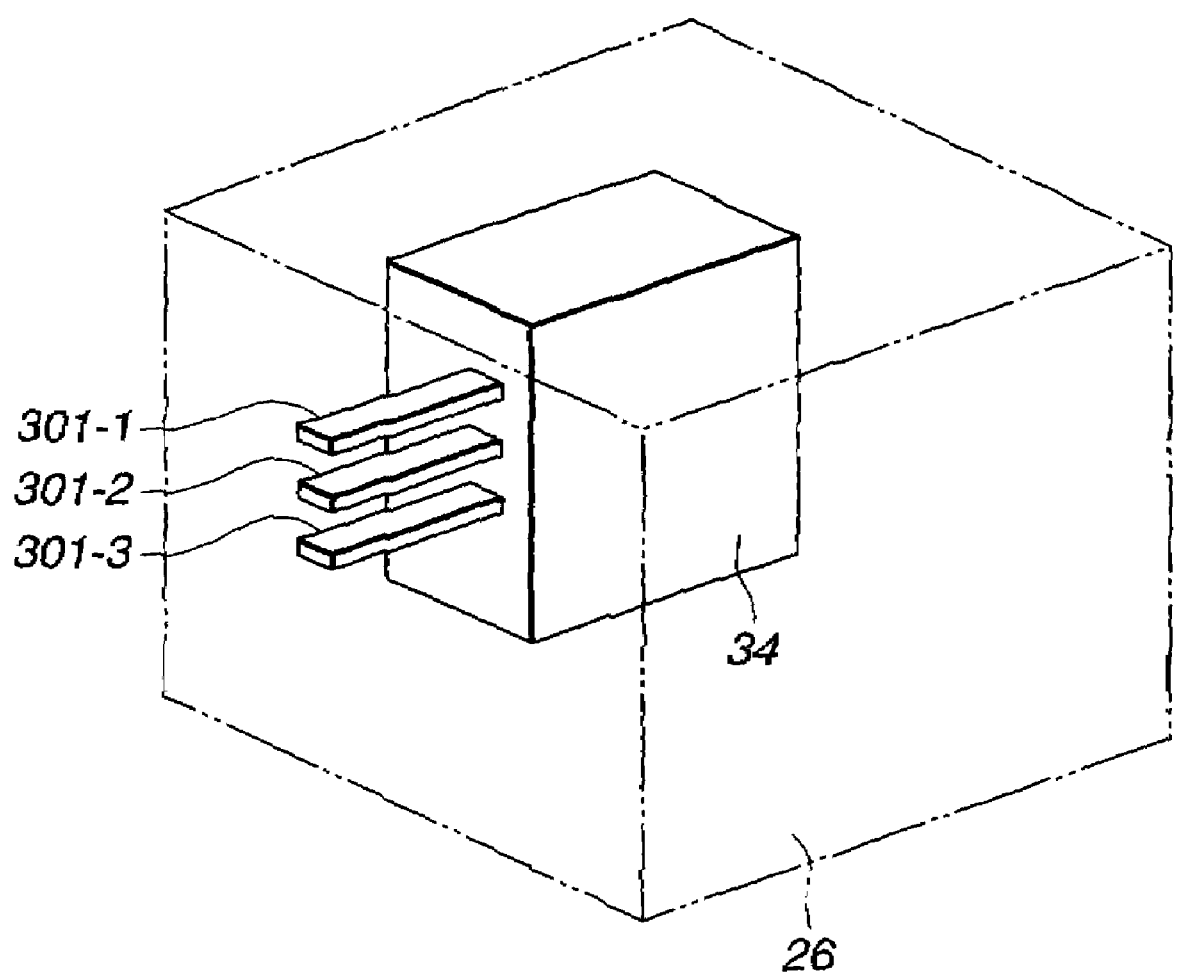
FIG. 30 shows an illustrative inner structure of the non-volatile memory.

As also shown in FIG. 30, interconnections 301-1 to 301-3 for data writing or readout to or from the non-volatile memory 34 are formed so as to be superimposed one on another in the vertical (depth-wise) direction. In such structure, the upper interconnections 301-1 and 301-2 need to be removed in order to read out data from the lower interconnection 301-3, so that data cannot be read simultaneously from the plural interconnections 301-1 to 301-3. Moreover, if the interconnections 301-1 to 301-3 are provided redundantly and probed directly, it may be rendered difficult to analyze the contents by the resulting additional capacitance.

In the foregoing, the portable device 6 is used as a recording medium. The present invention can, however, be applied to transferring or copying data to other recording mediums.

The data may also be picture data or other data in place of the music data.

As described above, the present invention gives to the following meritorious effects:

(1) Since the data can be recorded encrypted on the HDD 21, while the encryption key is also encrypted with the storage key and recorded on the HDD 21, if the music data, recorded on the HDD 21, is copied, it cannot be decoded, so that it is possible to prevent duplication from being distributed in large quantities.

(2) Since a pre-set musical number and its recording date and time are registered on the musical number database, so that, if the musical number is copied once, it cannot be copied for a pre-set time, 48 hours in the illustrated embodiment, as from the time of copying. It is possible in this manner to limit the number of times of copying to prevent duplications from being distributed in large quantities.

Moreover, the hash values of the data are computed and saved each time the database is innovated, thus facilitating prevention of data falsification.

(3) If once the music data is transferred to an external device, the music data on the HDD 21 is erased, so that original digital music data is not left in the HDD 21 to prevent the duplications from being distributed in large quantities.

(4) Since the music number database is provided in the HDD 21, and the entire hash value is checked each time, the data of the originating side can be erased reliably even if the contents of the HDD is supported directly before the movement, and the data, thus supported, are re-stored in the HDD 21 directly following the movement.

(5) Since reciprocal authentication is carried out before the personal computer 1 hands over the data to the external equipment, data can be prevented from being handed over to an unauthorized equipment.

(6) Since it is verified by reciprocal authentication whether or not the software of the personal computer 1 is legal, before transferring data from the external equipment to the personal computer 1, music data can be prevented from being transferred to the unauthorized software.

(7) Since the ISRC is used in verifying the identity of the musical number and the TOC is used if the ISRC cannot be acquired, the identity of the musical number can be verified even although the ISRC cannot be acquired.

(8) Since a pre-set portion of the software function in the personal computer 1 is borne by the adapter externally mounted on the personal computer 1, the overall processing cannot be comprehended if simply the software of the personal computer 1 is analyzed, with the result that it is difficult to modify the software to impart a desired function to the software.

Meanwhile, the processing executed by the adapter 26 can also be executed by the CPU 11 by a secure program. In such case, the personal computer 1 downloads the current time data from a particular server connected to the network 2, such as EMD registration server 3, for use in place of the current time supplied by the RC 35 of the adapter 26, to execute the decision processing based on this current time. It is also possible for the personal computer to store the current time at regular time intervals to display an error without accepting time setting, if the time previous to the memorized time is set.

Although the above-described operating sequence can be executed by hardware, it can also be implemented by software. In the latter case, the software constituting the software is installed from a program storage medium to a computer having a dedicated hardware or to a general-purpose personal computer capable of executing a variety of functions on installing variable programs.

The program storage medium, installed on a computer and which can be executed by the computer, may be exemplified by a magnetic disc 41, inclusive of a floppy disc, an optical disc 42, inclusive of a CD-ROM (Compact Disc-Read Only Memory) and a DVD (Digital Versatile Disc), a magneto-optical disc 43, including a MD (Mini-Disc), a package media comprising a semiconductor memory 44, a ROM 12 in which a program can be transiently or permanently stored, and a HDD 21. The program is stored in the program storage medium by exploiting wired or radio communication medium, such as a network, e.g., local area network or the Internet 2 or a digital/satellite broadcasting.

In the present specification, the steps describing the programs stored in the program storage medium includes not only the processing carried out chronologically in accordance with the pre-set sequence, but also the processing which is executed in parallel or batch-wise without necessarily being executed chronologically.

In the present specification, the system means an entire device constructed by plural devices.

In the information processing method and apparatus and the program storage medium, according to the present invention, the time information at the time of duplication is stored in association with the content discrimination information, with the result that duplications in large quantities can be substantially prohibited without significantly impairing the interests of the user.

The invention claimed is:

1. An information processing method comprising: storing information for discriminating contents duplicated in the past with respect to a specific device and temporal data as to a previous start time of duplication of the contents into a database of the specific device; requesting a further duplication of the contents with respect to the specific device; acquiring the information for discriminating content to be duplicated from the database of the specific device; deciding whether copying of the contents discriminated by the discriminating information is allowed in accordance with a comparison between the temporal data stored in the database and current time; allowing copying of the content; and duplicating the contents in accordance with said decision wherein the duplication of the content is prohibited when an interval of time between the current time and the previous start time of duplication of said content specified by the temporal data stored in the database with respect to the predetermined device is less than predetermined amount of time.

2. The information processing method according to claim 1 wherein said contents is reproduced from an information storage medium of the specific device.

3. The information processing method according to claim 2 wherein said information recording medium is a compact disc.

4. The information processing method according to claim 1 wherein the discriminating contents is the ISRC.

5. The information processing method according to claim 1 wherein the discriminating information for discriminating the contents is the TOC (Table of Contents).

6. The information processing method according to claim 4 wherein the ISRC (International Standard Recording Code) as the discriminating information for discriminating contents is accessed from an information recording medium and, if the ISRC is not stored in said information recording medium, data of a TOC (Table of Contents) of the information recording medium is utilized as said discriminating information.

7. The information processing method according to claim 1, further comprising: checking data in said database; and detecting modification using a hash function.

8. The information processing method according to claim 1 wherein said predetermined amount of time is a fixed value.

9. The information processing method according to claim 1 wherein duplication of the content is allowed when said discrimination information and temporal data of the content to be duplicated is not stored in the database.

10. The information processing method according to claim 8 further comprising: detecting a watermark encoded in the content to be duplicated; and wherein said duplicating of contents is dependent on the basis of the watermark if the duplicating is allowed in accordance with the information for discriminating contents.

11. The information processing method according to claim 1, further comprising: updating the previous start time of duplication in the database to the present time when the duplication of content is allowed.

12. A program storage medium including computer program instructions that cause a computer to implement an information processing method comprising: storing information for discriminating contents duplicated in the past with respect to a specific device and temporal data as to a previous start time of duplication of the contents into a database of the specific device; requesting a further duplication of the contents with respect to the specific device; acquiring the information for discriminating content to be duplicated from the database of the specific device; deciding whether copying of the contents discriminated by the discriminating information is allowed in accordance with a comparison between the temporal data stored in the database and current time; allowing copying of the content; and duplicating the contents in accordance with said decision, wherein the duplication of the content is prohibited when an interval of time between the current time and the previous start time of duplication of said content specified by the temporal data stored in the database with respect to the predetermined device is less than predetermined amount of time.

13. The program storage medium including computer program instruction for causing a computer to implement an information processing method according to claim 12, further comprising: updating the previous start time of duplication in the database to the present time when the duplication of content is allowed.

* * * * *

UNITED STATES PATENT AND TRADEMARK OFFICE
CERTIFICATE OF CORRECTION

PATENT NO. : 7,249,106 B1  
APPLICATION NO. : 09/622517  
DATED : July 24, 2007  
INVENTOR(S) : Ryuji Ishiguro et al.

Page 1 of 1

It is certified that error appears in the above-identified patent and that said Letters Patent is hereby corrected as shown below:

Column 8, line 23, change "time" to --times--;
        line 24, change "CPU53" to --CPU 53--.
Column 9, line 17, change "o" to --to--;
        line 66, change "Allocation Ttable" to --allocation Table--.
Column 14, line 63, change "mt" to --my- --.
Column 15, line 8, change "ser" to --user--.
Column 16, line 42, change "inoffrom" to --in or from--.
Column 18, line 59, change "S115" to --S15--.
Column 21, line 39, change "111" to --11--.
Column 25, line 63, change "11" to --1--.
Column 26, line 48, change "ro" to --to--.

Signed and Sealed this

Twentieth Day of May, 2008

JON W. DUDAS  
*Director of the United States Patent and Trademark Office*